United States Patent
Hassan Hussein et al.

(10) Patent No.: US 12,149,350 B2
(45) Date of Patent: *Nov. 19, 2024

(54) PUNCTURED INFORMATION FOR FLEXIBLE/FULL DUPLEX COMMUNICATION

(71) Applicant: Fraunhofer-Gesellschaft zur Förderung der angewandten Forschung e.V., Munich (DE)

(72) Inventors: Khaled Shawky Hassan Hussein, Erlangen (DE); Rudraksh Shrivastava, Stuttgart (DE); Thomas Heyn, Erlangen (DE); Bernhard Niemann, Erlangen (DE); Thomas Haustein, Berlin (DE); Ramez Askar, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 438 days.

This patent is subject to a terminal disclaimer.

(21) Appl. No.: 17/301,815

(22) Filed: Apr. 15, 2021

(65) Prior Publication Data

US 2021/0258100 A1 Aug. 19, 2021
US 2023/0148438 A9 May 11, 2023

Related U.S. Application Data

(63) Continuation of application No. PCT/EP2019/078216, filed on Oct. 17, 2019.

(30) Foreign Application Priority Data

Oct. 17, 2018 (EP) .................. 2018/078463

(51) Int. Cl.
*H04W 56/00* (2009.01)
*H04L 1/00* (2006.01)
(Continued)

(52) U.S. Cl.
CPC .............. *H04L 1/0068* (2013.01); *H04L 5/14* (2013.01); *H04W 72/0446* (2013.01);
(Continued)

(58) Field of Classification Search
CPC ...... H04L 1/0068; H04L 5/14; H04W 72/535; H04W 72/0446; H04W 72/0453; H04W 72/1263
(Continued)

(56) References Cited

U.S. PATENT DOCUMENTS

2006/0126546 A1  6/2006  Lee et al.
2014/0269455 A1* 9/2014  Kim ..................... H04W 48/12
                                                    370/280

(Continued)

FOREIGN PATENT DOCUMENTS

WO  2016/138664 A1  9/2016
WO  2017/008851 A1  1/2017

(Continued)

OTHER PUBLICATIONS

"Frederiksen, Enabling Uplink Transmission During Downlink Subframe Based on Preemption of Data Transmission in Wireless Network, WO 2019/058022, 2019" (Year: 2019).*

(Continued)

*Primary Examiner* — Sai Ming Chan
(74) *Attorney, Agent, or Firm* — McClure, Qualey & Rodack, LLP

(57) ABSTRACT

There are disclosed techniques for puncturing and/or overlaying transmission in case of necessity of on-demand (e.g., urgent) commutations. In particular, transceivers, user (Continued)

equipments, systems, methods and non-transitory storage units are disclosed. For example, there is disclosed a transceiver of a wireless communication network, wherein the transceiver is configured to operate in a puncturing mode by puncturing a downlink, DL, transmission of payload information in a channel originally allocated to the DL transmission of payload information, to obtain, within the originally allocated channel for the DL transmission of payload information, a DL free area for an uplink, UL, transmission of a user equipment, UE, of the wireless communication network.

15 Claims, 25 Drawing Sheets

(51) Int. Cl.
    *H04L 5/14*         (2006.01)
    *H04W 72/0446*   (2023.01)
    *H04W 72/0453*   (2023.01)
    *H04W 72/1263*   (2023.01)
    *H04W 72/50*     (2023.01)

(52) U.S. Cl.
    CPC ... *H04W 72/0453* (2013.01); *H04W 72/1263* (2013.01); *H04W 72/535* (2023.01)

(58) Field of Classification Search
    USPC .......................................................... 370/329
    See application file for complete search history.

(56) References Cited

U.S. PATENT DOCUMENTS

| | | | |
|---|---|---|---|
| 2017/0310435 A1* | 10/2017 | Wei | H04L 5/0044 |
| 2018/0019859 A1 | 1/2018 | Cheng et al. | |
| 2018/0083817 A1 | 3/2018 | Salem et al. | |
| 2018/0097607 A1 | 4/2018 | Ji et al. | |
| 2018/0287739 A1* | 10/2018 | Kim | H04J 11/0023 |
| 2019/0181922 A1* | 6/2019 | Lee | H04B 7/0626 |

FOREIGN PATENT DOCUMENTS

| | | |
|---|---|---|
| WO | 2017/134336 A1 | 8/2017 |
| WO | 2018/126934 A1 | 7/2018 |

OTHER PUBLICATIONS

International Search Report issued in application No. PCT/EP2019/078216.
Written Opinion issued in application No. PCT/EP2019/078216.
European Office Action dated Sep. 7, 2023, issued in application No. EP 19786599.1.
CATT; "Clarification on flexible duplex;" 3GPP TSG RAN WG1; Meeting #87; vol. RAN WG1, No. Reno, USA; Nov. 14, 2016-Nov. 18, 2016, (Nov. 13, 2016), 3GPP Draft; R1-1611404, 3rd Generation Partnership Project (3GPP), Mobile Competence Centre ; 650, Route Des Lucioles ; F-06921 Sophia-Antipolis Cedex; France URL: http://www.3gpp.org/ftp/Meetings_3GPP_SYNC/RAN1/Docs/, (Nov. 13, 2016), XP051175385 [A]; pp. 1-2.
LG Electronics et al; "New SI proposal: Study on flexible and full duplex for NR;" vol. TSG RAN, No. Lisbon, Portugal; Dec. 18, 2017-Dec. 21, 2017, (Dec. 21, 2017), 3GPP Draft; RP-172737, 3rd Generation Partnership Project (3GPP), Mobile Competence Centre; 650, Route Des Lucioles ; F-06921 Sophia-Antipolis Cedex; France; URL:http://www.3gpp.org/ftp/tsg%5Fran/TSG%5FRAN/TSGR%5F78/Docs/RP%2D172737%2Ezip, (Dec. 21, 2017), XP051670953 [A]; pp. 1-6.

\* cited by examiner

| configuration | switch-point periodicity | uplink-downlink allocations subframe number | | | | | | | | | | DL:UL |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | 2:3 |
| 1 | 5 ms | D | S | U | U | D | D | S | U | U | D | 3:2 |
| 2 | 5 ms | D | S | U | D | D | D | S | U | D | D | 4:1 |
| 3 | 10 ms | D | S | U | U | U | D | D | D | D | D | 7:3 |
| 4 | 10 ms | D | S | U | U | D | D | D | D | D | D | 8:2 |
| 5 | 10 ms | D | S | U | D | D | D | D | D | D | D | 9:1 |
| 6 | 5 ms | D | S | U | U | U | D | S | U | U | D | 3:3:2:2 | table 1

Fig. 3a

<38.211 – table 4.3.2-3: slot formats>
D: downlink, U: uplink, X: flexible table 1 (first part)

| format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U | symbol number in a slot

PUNCTURED INFORMATION FOR FLEXIBLE/FULL DUPLEX COMMUNICATION

CROSS-REFERENCES TO RELATED APPLICATIONS

This application is a continuation of copending International Application No. PCT/EP2019/078216, filed Oct. 17, 2019, which is incorporated herein by reference in its entirety, and additionally claims priority from International Application No. PCT/EP2018/078463, filed Oct. 17, 2018, which is incorporated herein by reference in its entirety.

The present invention relates to the field of wireless communication networks, and more specifically, to concepts for transmitting data in wireless communication networks. Embodiments of the present invention relate to punctured/on-demand control information for flexible/full duplex communication.

BACKGROUND OF THE INVENTION

FIG. 1 is a schematic representation of an example of a wireless network 100 including a core network 102 and a radio access network 104. The radio access network 104 may include a plurality of base stations eNB1 to eNBs, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $eNB_1$ to eNBs may be connected, e.g. via the X1 or X2 interface, with each other via respective backhaul links $116_1$ to $116_5$, which are schematically represented in FIG. 1 by the arrows pointing to "enBs"

The wireless network or communication system depicted in FIG. 1 may by a heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations.

For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random-access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system using frequency-division multiplexing, like the orthogonal frequency-division multiplexing (OFDM) system, the orthogonal frequency-division multiple access (OFDMA) system, or filtered orthogonal frequency-division multiplexing (f-OFDM), or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station MeNB$_1$ as indicated by arrow 1241 and by the small cell base station SeNB$_1$, as indicated schematically by the arrow 1242.

In wireless communication networks, e.g. as described above and/or below, full duplex communication, half duplex communication, i.e., time-division duplexing (TDD), frequency-division duplexing (FDD), frequency/time division multiplexing (FDM/TDM), downlink control information (DCI) and uplink control information (UCI) are known.

Scheduling

In several communication schemes, transmissions are scheduled. A scheduler device (such as a base station, BS, a coordinator, or the like) may therefore define a time scheme which is in general to be followed by the other devices (e.g., user equipments, UEs). For example, the scheduling may grant to each device particular resources, e.g., frequency bands and/or time slots. A device knows, in general, whether to send and where to receive at each time instant. Time may be subdivided by the scheduling into periods, which vary according to different configurations. Table 1 of FIG. 3a shows an example of seven different configurations. Each configuration may define a period which may be 5 ms or 10 ms long (other lengths are possible). Each period is subdivided into ten subframes (other numbers are possible). In Table 1, D=Downlink or DL (from a BS to a UE); U=uplink or UL (from a UE to a BS); S=special frame. Therefore, for each configuration, the direction of the transmission (DL vs UL) is pre-defined by the configuration. Each subframe may be divided into a plurality of symbols (e.g., 14 symbols), each symbol encoding information. In Table 1, each subframe is formed by 14 symbols: D subframes have fourteen DL symbols, U subframes have fourteen UL symbols. Notably, signals may be transmitted, in UL or DL, at different frequency bands in the same time slot.

This technique has been generalized by relying on the definition of different formats for the scheduled subframe as in Table 2 of FIG. 3b (divided into FIGS. 3b-1 and 3b-2 for clarity). Each subframe may have a particular format (e.g., between 0 and 255), so that the direction (UL vs DL) of each symbol is scheduled. For example, format 0 refers to 14 consecutive DL subframes (which therefore may be used for a DL subframe in Table 1), while format 1 refers to 14 consecutive UL subframes (which therefore may be used for a UL subframe in Table 1). Table 2 shows that different combinations of directions (UL vs DL) for different symbols may be defined in the same subframe. Therefore, much more scheduling combinations can be reached than with by scheduling using only Table 1. The scheduling can therefore be more sophisticated.

A flexible duplexing configuration may be provided by the use of undetermined "X" symbols, which may be either DL or UL symbols and may be contention-based symbols.

SUMMARY

An embodiment may have a transceiver of a wireless communication network, wherein the transceiver is configured to operate in a puncturing mode by puncturing a downlink, DL, transmission of payload information in a channel originally allocated to the DL transmission of payload information or determining a DL free area, to obtain or identify, within said originally allocated channel for the DL transmission of payload information, a DL free area for an uplink, UL, transmission of a user equipment, UE, of the wireless communication network to the transceiver.

Another embodiment may have a transceiver of a wireless communication network, wherein the transceiver is configured to operate in a puncturing mode in which an UL transmission of payload information is punctured in a channel originally allocated to the UL transmission of payload information from a UE or in which a UL free area is determined in the channel originally allocated to the UL transmission of payload information from a UE, to obtain or identify, within said originally allocated channel for the UL transmission of payload information from the UE, an UL free area for a DL transmission of payload information to the UE.

Yet another embodiment may have a user equipment, UE, of a wireless communication network, wherein the UE is configured to perform an UL transmission to a transceiver of the wireless communication network in a channel originally allocated to a DL transmission of payload information from said transceiver, wherein the UE is configured to operate in puncturing mode by performing said UL transmission in a DL free area of said channel originally allocated to the DL transmission of payload information and/or by determining a DL free area so as to perform an UL transmission to the transceiver.

Still another embodiment may have a user equipment, UE, of a wireless communication network, wherein the UE is configured to receive a DL transmission from a transceiver of the wireless communication network in a channel originally allocated to an UL transmission of payload information, wherein the UE is configured to operate in puncturing mode by receiving said DL transmission in an UL free area of said channel originally allocated to the UL transmission of payload information from the UE.

Another embodiment may have a system including a base station, BS, a first user equipment, UE, and a second UE, wherein an original scheduling pre-allocates a communication channel for a downlink, DL, communication, wherein the system is configured operate in a puncturing mode so as to puncture the pre-allocated communication channel to obtain a DL free area to permit an on-demand UL communication between the second UE and the BS or to identify a DL free area in the pre-allocated DL area for an UL transmission from the UE to the base station.

According to an embodiment, a method for the communication between a base station, BS, a first user equipment, UE, and a second UE may have the step of:

using an original scheduling, pre-allocating a communication channel for a communication in a first direction, wherein the system punctures the pre-allocated communication channel to obtain a free area, or identifies a free area, to permit an on-demand communication between the second UE and the BS in a second direction different from the first direction.

According to another embodiment, a non-transitory digital storage medium may have a computer program stored thereon to perform the inventive method, when said computer program is run by a computer.

In accordance with an aspect, there is provided a transceiver of a wireless communication network, wherein the transceiver is configured to operate in a puncturing mode by puncturing a downlink, DL, transmission of payload information in a channel originally allocated to the DL transmission of payload information or determining a DL free area, to obtain or identify, within said originally allocated channel for the DL transmission of payload information, a DL free area for an uplink, UL, transmission of a user equipment, UE, of the wireless communication network.

In accordance with an aspect, there is provided a transceiver of a wireless communication network, configured to operate, on demand, in a overlaying mode so as to define, in a channel originally allocated to the DL transmission of payload information to a first user equipment, UE, an overlaid transmission with the first UE and a second UE, to obtain, within said channel originally allocated to the DL transmission of payload information to the first UE, an overlaid area for an UL transmission from said second UE overlaid to the DL transmission to the first UE.

The transceiver may be configured to choose between operating in overlaying mode and in puncturing mode.

In accordance with an aspect, there is provided a transceiver configured to operate in a puncturing mode in which an UL transmission of payload information is punctured in a channel originally allocated to the UL transmission of payload information from a UE or in which a UL free area is determined in the channel originally allocated to the UL transmission of payload information from a UE, to obtain or identify, within said originally allocated channel for the UL transmission of payload information from the UE, an UL free area for a DL transmission of payload information.

In accordance with an aspect, there is provided a transceiver configured to operate, on demand, in an overlaying mode so as to define, in a channel originally allocated to the UL transmission of payload information from a first UE, an overlaid transmission with the first UE and a second UE, to obtain, within said channel originally allocated to the UL transmission of payload information from the first UE, an overlaid area for a DL transmission to said second UE overlaid to the UL transmission from the first UE.

The transceiver may be configured to choose between operating in overlaying mode and in puncturing mode.

The transceiver may be configured to perform the choice on the basis of a selection and/or data associated to the first and/or second UEs.

The transceiver may be configured to receive a request for urgent transmission and/or an on-demand transmission from a UE, so as to choose whether to allow or deny the urgent transmission and/or an on-demand transmission and/or to operate in puncturing mode and/or overlaying mode.

The transceiver may be configured to signal the result of the choice to the UE(s).

In accordance with an aspect, there is provided a transceiver of a wireless communication network configured to operate in multiconnectivity with an external transceiver to perform uplink, UL, and/or downlink, DL, transmissions with a UE,
  wherein the transceiver is configured to operate in a puncturing mode by:
    puncturing a DL transmission of payload information in a channel originally allocated to the transceiver for the DL transmission of payload information of the transceiver or determining a DL free area in the channel originally allocated to the transceiver for the DL transmission of payload information of the transceiver, to obtain or identify, within said channel originally allocated to the transceiver, a DL free area for an uplink, UL, transmission of the UE to the external transceiver; and/or
    requesting to puncture a DL transmission of payload information in a channel originally allocated to the external transceiver for the DL transmission of payload information of the external transceiver or determine a DL free area in the channel originally allo-
    cated to the external transceiver for the DL transmission of payload information of the external transceiver, to obtain or identify, within said channel originally allocated to the external transceiver, a DL free area for an UL transmission of the UE to the transceiver.

In accordance with an aspect, there is provided a transceiver of a wireless communication network, wherein the transceiver is configured to operate in multiconnectivity with an external transceiver to perform UL and/or DL transmissions with a UE,
  wherein the transceiver is configured to operate in a puncturing mode by:
    puncturing a DL transmission of payload information, in a channel originally allocated to the transceiver for the DL transmission of payload information of the transceiver or determining a DL free area in the channel originally allocated to the transceiver for the DL transmission of payload information of the transceiver, to obtain or identify, within said channel originally allocated to the transceiver, a DL free area for a DL transmission from the external transceiver to the UE; and/or
    requesting to puncture a DL transmission of payload information, in a channel originally allocated to the external transceiver for the DL transmission of payload information of the external transceiver, to obtain, within said channel originally allocated to the external transceiver, a DL free area for a DL transmission of the transceiver to the UE.

The transceiver may be non-FDC-capable, wherein the transceiver is configured to puncture a complete slot at different frequencies, wherein the UE can be FDC-capable.

The transceiver may be configured to determine the DL or UL free area and/or the overlaid area according to a different and/or variable pattern, so as to reduce the probability of puncturing an area associated to a high signal quality.

In accordance with an aspect, there is provided a transceiver the DL or UL free area includes a time slot and/or one or more symbols in a flexible time slot and at least one frequency.

The transceiver may be configured to select at least one frequency of the DL or UL free area.

The transceiver may be configured to select at least one time slot of the DL or UL free area.

The may be configured to signal to the UE(s):
  information whether FDC or puncturing has been chosen; and/or
  information on the UE(s) for which data are punctured and/or the UE(s) that obtain the punctured and/or a overlaid area; and/or
  information on the channel on which the puncturing or FDC is performed; and/or
  information on a particular time position in which the punctured or overlaid areas are to be positioned; and/or
  information on frequencies of the punctured or overlaid area;
  information on timing tolerances or guard times or guard symbols and/or guard subcarriers.

In accordance with an aspect, there is provided a user equipment, UE, of a wireless communication network, configured to perform an UL transmission to a transceiver of the wireless communication network in a channel originally allocated to a DL transmission of payload information from said transceiver,
  wherein the UE is configured to operate in puncturing mode by performing said UL transmission in a DL free area of said channel originally allocated to the DL transmission of payload information and/or by determining a DL free area so as to perform an UL transmission.

The may be configured, after having identified the DL free area, to autonomously perform the UL transmission in the original DL free area.

The UE may be configured to autonomously perform the UL transmission in the original DL occupied or free area with increased power.

In accordance with an aspect, there is provided a user equipment, UE, of a wireless communication network, configured to receive a DL transmission from a transceiver of the wireless communication network in a channel originally allocated to an UL transmission of payload information,
wherein the UE is configured to operate in puncturing mode by receiving said DL transmission in an UL free area of said channel originally allocated to the UL transmission of payload information.

The UE may be configured to receive, from the transceiver, an indication information indicating whether the transceiver operates in puncturing mode or in overlaying mode in which the UE is in DL while an external UE is in UL or vice versa.

The UE may be configured to reduce the power of the transmission in case of information indicating that the transceiver operates in FDC mode.

The UE may be further configured to increase the power of the in case of information indicating that the transceiver operates in puncturing mode.

The UE may be further configured to skip decoding data transmitted by puncturing from different UEs and/or directed to different UEs.

The UE may be further configured to maintain, in a buffer, data received from the transceiver and to wait for supplementary data in subsequent DL transmissions.

In accordance with an aspect, there is provided a UE of a wireless communication network for communicating with a first transceiver and a second transceiver,
wherein the UE is configured to operate in puncturing mode by receiving a DL transmission from the first transceiver and to send an UL transmission to the second transceiver in the DL area, wherein the DL free area is an area of a channel (921) originally allocated to the DL transmission of payload information from the first transceiver.

In accordance with an aspect, there is provided a user equipment, UE, of a wireless communication network, wherein the UE is configured to receive a DL transmission from a second transceiver of the wireless communication network in a channel originally allocated to a first transceiver for a DL transmission of payload information,
wherein the UE is configured to operate in puncturing mode by receiving said DL transmission from the second BS in a DL free area of said channel originally allocated to the first transceiver for the DL transmission of payload information In accordance with an aspect, there is provided a system comprising a base station, BS, a first user equipment, UE, and a second UE,
wherein an original scheduling pre-allocates a communication channel for a downlink, DL, communication,
wherein the system is configured operate in a puncturing mode so as to puncture the pre-allocated communication channel to obtain a DL free area to permit an on-demand UL communication between the second UE and the BS or to identify a DL free area in the pre-allocated DL area.

In accordance with an aspect, there is provided a system comprising a base station, BS, a first user equipment, UE, and a second UE,
wherein an original scheduling pre-allocates a communication channel for a DL communication,
wherein the system is configured to
operate in overlaying mode so that the second UE performs a UL communication overlaid to a DL communication to the first UE in an overlaid area of a pre-allocated communication channel pre-allocated to the DL communication to the first UE.

The system may be configured to perform choice between operating in puncturing mode and operating in overlaying mode.

In accordance with an aspect, there is provided a system comprising a first base station, BS, a second BS, and a user equipment, UE,
wherein an original scheduling pre-allocates a communication channel for a first downlink, DL, communication from the first BS,
wherein the system is configured to operate in puncturing mode so as to puncture the pre-allocated communication channel to obtain a DL free area to permit an on-demand DL communication between the second BS and the UE or to identify a DL free area to permit an on-demand DL communication between the second BS and the UE.

In accordance with an aspect, there is provided a system comprising a first base station, BS, a second BS, and a user equipment, UE,
wherein an original scheduling pre-allocates a communication channel for a downlink, DL, communication from the first BS,
wherein the system is configured to operate in puncturing mode so as to puncture the pre-allocated communication channel to obtain a DL free area to permit an on-demand UL communication between the UE and the second BS or to identify a DL free area in the original scheduling so as to permit an on-demand UL communication between the UE and the second BS in the identified DL free area.

In accordance with an aspect, there is provided a method for the communication between a base station, BS, a first user equipment, UE, and a second UE, comprising:
using an original scheduling, pre-allocating a communication channel for a communication in a first direction,
wherein the system punctures the pre-allocated communication channel to obtain a free area, or identifies a free area, to permit an on-demand communication between the second UE and the BS in a second direction different from the first direction.

In accordance with an aspect, there is provided a method for a communication between a first base station, BS, a second BS, and a user equipment, UE,
using an original scheduling, pre-allocating a communication channel for a first downlink, DL, communication from the first BS,
wherein the system punctures the pre-allocated communication channel to obtain a DL free area, or identifies a free area, to permit an on-demand DL communication between the second BS and the UE.

In accordance with an aspect, there is provided a method for a communication between a first base station, BS, a second BS, and a user equipment, UE, using a scheduling, pre-allocating a communication channel for a downlink, DL, communication from the first BS,
wherein the system punctures the pre-allocated communication channel to obtain a DL free area to permit an on-demand UL communication between the UE and the second BS.

In accordance with an aspect, there is provided a method for the communication between a transceiver, a first user equipment, UE, and a second UE, comprising:
using an original scheduling, pre-allocating a communication channel for a communication in a first direction,
overlaying the pre-allocated communication channel to obtain a overlaid area to permit an on-demand communication between the second UE and the BS in a second direction different from the first direction.

In accordance with an aspect, there is provided a non-transitory storage unit storing instructions which, when running in a processor, cause the processor to perform a method according to any of the methods above or below.

BRIEF DESCRIPTION OF THE DRAWINGS

Embodiments of the present invention will be detailed subsequently referring to the appended drawings, in which:
Embodiments of the present invention are described herein referring to the appended drawings.
FIGS. 3a, 3b-1 and 3b-2 show examples of communications;
FIGS. 7-1 to 7-6 show examples of communications;
FIG. 9-1 shows a system according to an example;
FIG. 9-1a shows a procedure according to an example;
FIGS. 9-2 and 9-3 show systems according to examples;
FIG. 9-4 shows a procedure according to an example;
FIGS. 10-1 and 10-2 show systems according to examples.

DETAILED DESCRIPTION OF THE INVENTION

Figure 1:
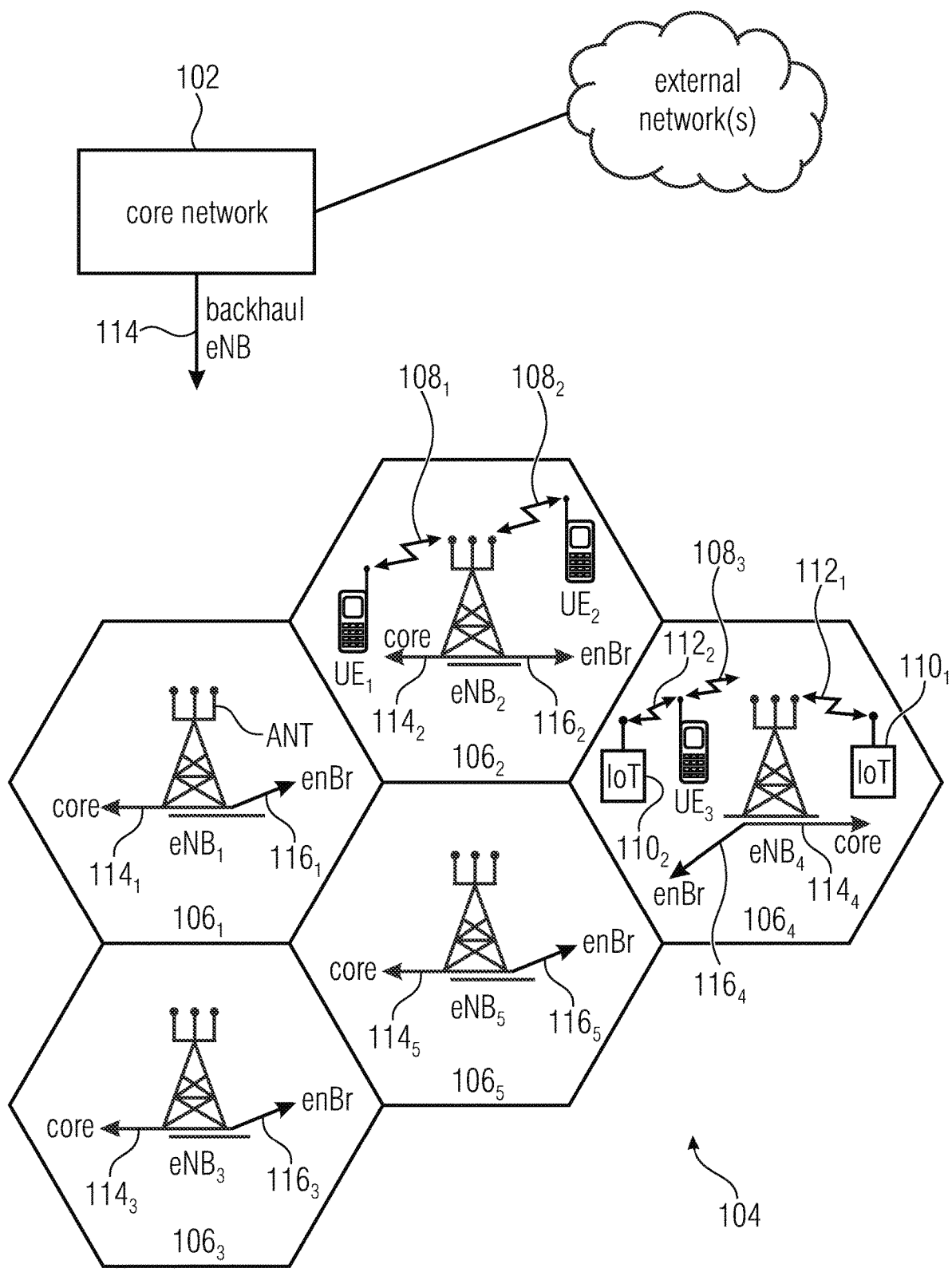
FIGS. 1 and 2 show examples of networks.

Equal or equivalent elements or elements with equal or equivalent functionality are denoted in the following description by equal or equivalent reference numerals.
On-Demand/Urgent Traffic
Full duplex is a key solution for the 5G/6G requirements like, e.g., high spectral, high traffic and throughput variations, and extremely high traffic asymmetry needs. Coexistence of different service requirements as ultra-reliable low-latency communication (URLLC) will be facilitated assuming bi-directional transmission in a single frequency band. However in TDD system with URLLC demanding, the following can be seen as a problem:
In TDD system, in static or dynamic cases, scheduling an urgent UL or DL may involve a delay induced by the selected frame configuration (see FIG. 7-1 for more details);
even in flexible duplexing, the decision to which from DL to UL and vice versa is still cell-wide, which makes it less reliable for urgent/on-demand traffic;
Moreover, the control subframes/special-subframes are also extending the waiting time before any possible scheduling.

Hence, a main challenge in TDD is that Urgent traffic in any arbitrary direction may demand low latency service; for TDD systems, a solution is needed. This is solved with our full duplex communication (FDC) proposals.

Transmissions may be scheduled, as explained above. For TDD-LTE, for example, the 3GPP community provides frame structures with the intent of providing a certain degree of flexibility in allocating UL/DL resources. Each base station (BS) or evolved node (eNB) is flexibly/or coordinately selecting one of the following 7 different UL/DL configurations (up to release 14) presented in table 1.

Figures 1, 7:
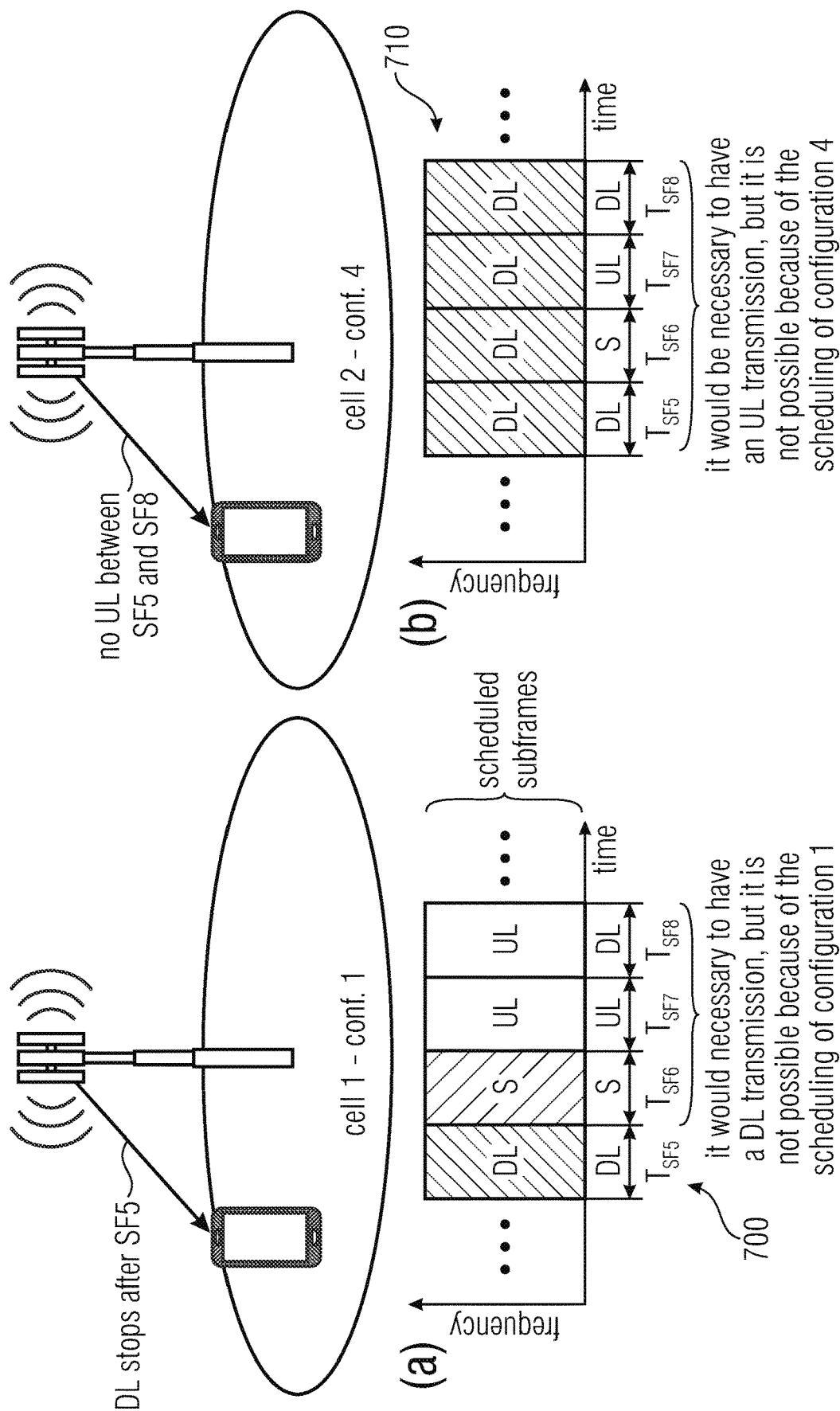
Figures 2, 7:
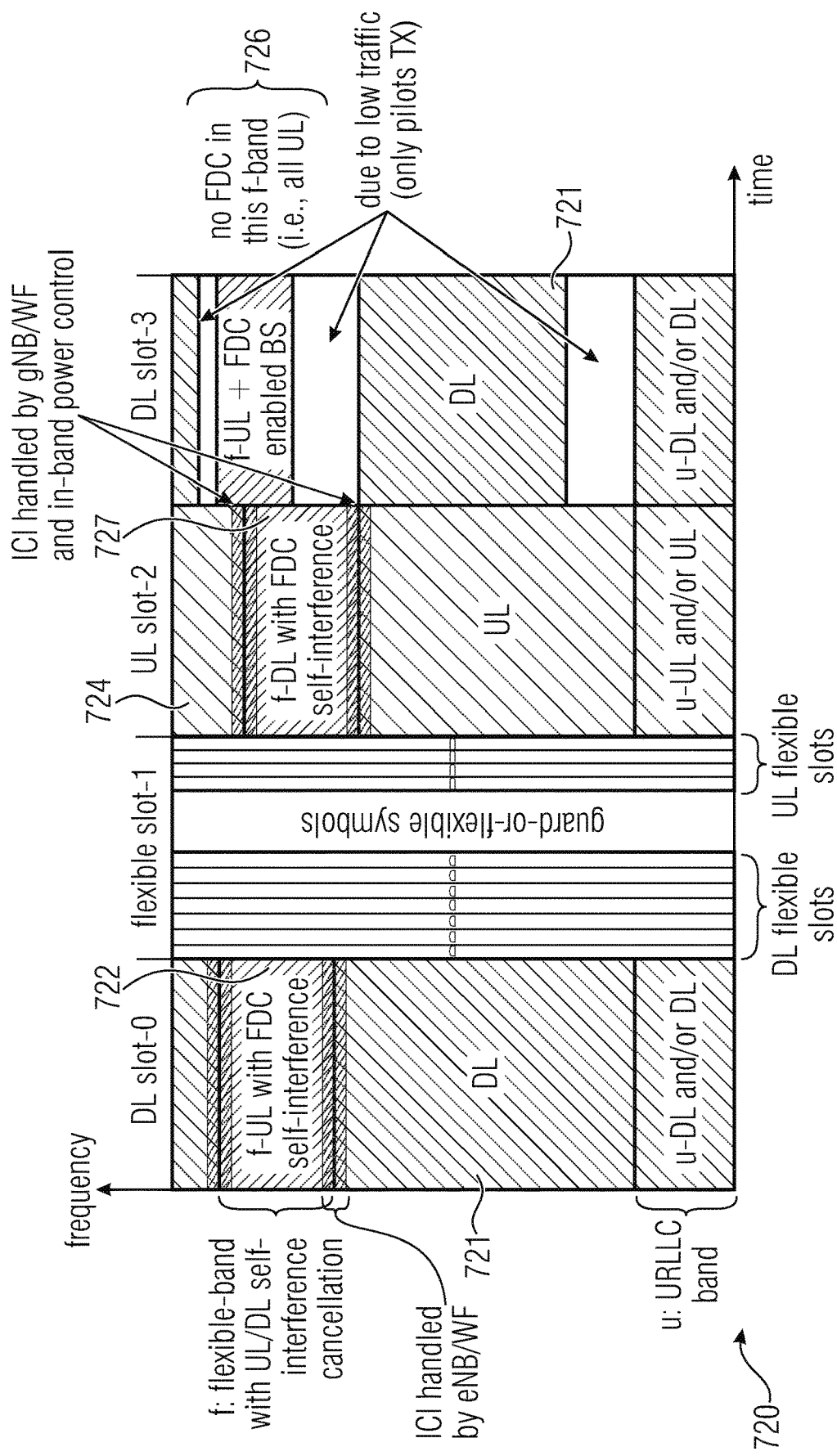
Figures 1, 9:
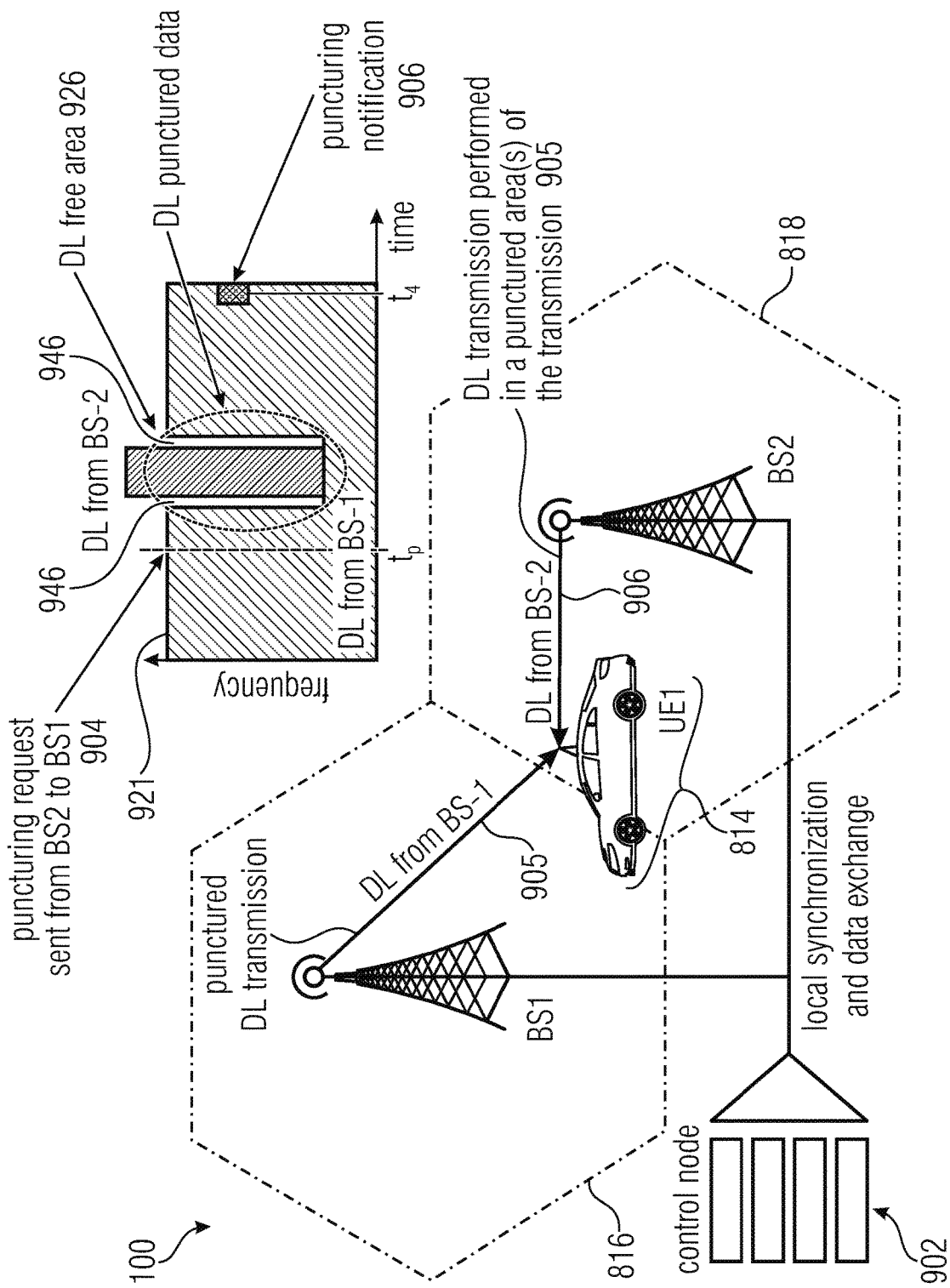
Figures 1A, 9:
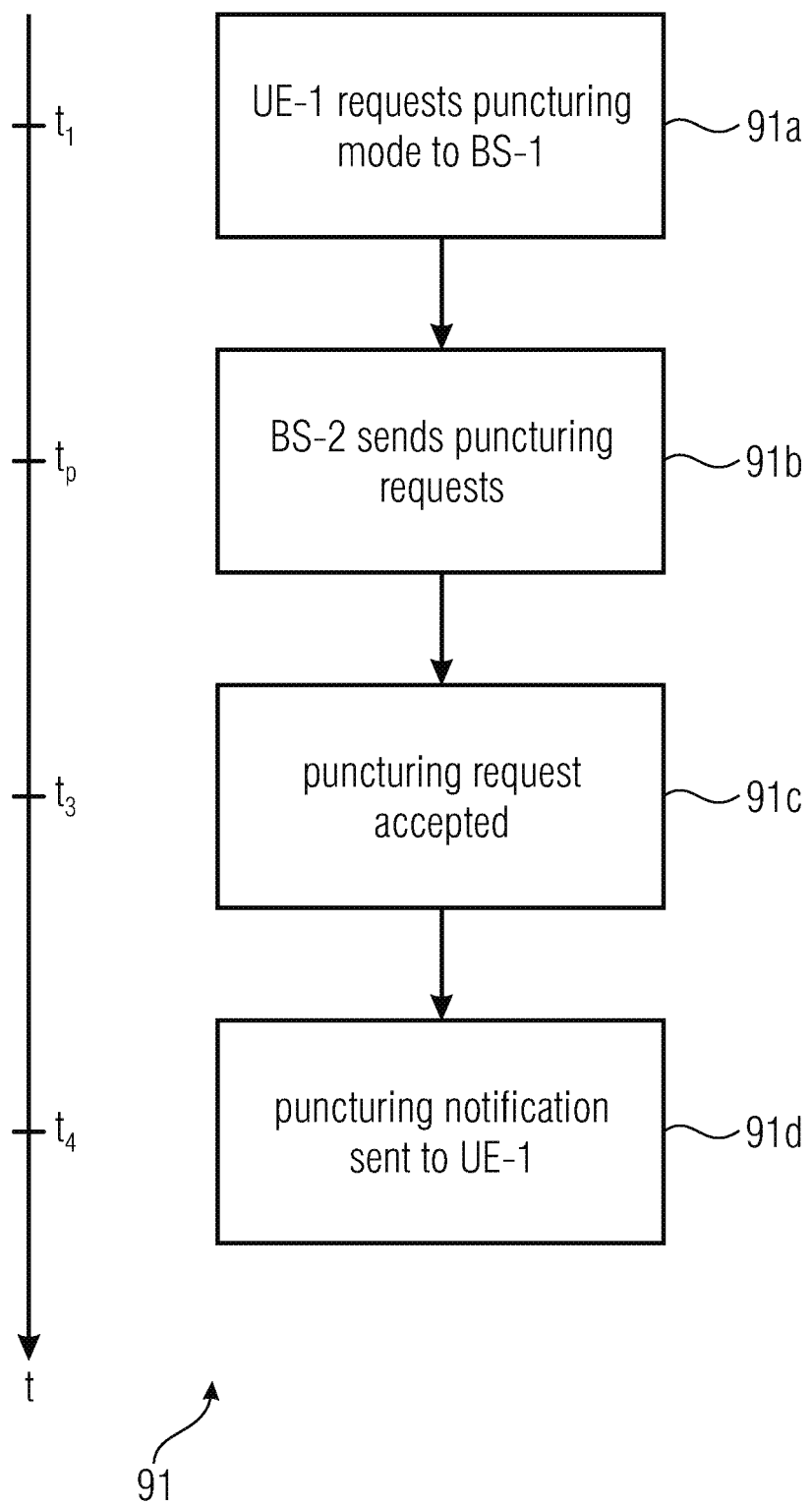
Figures 2, 9:
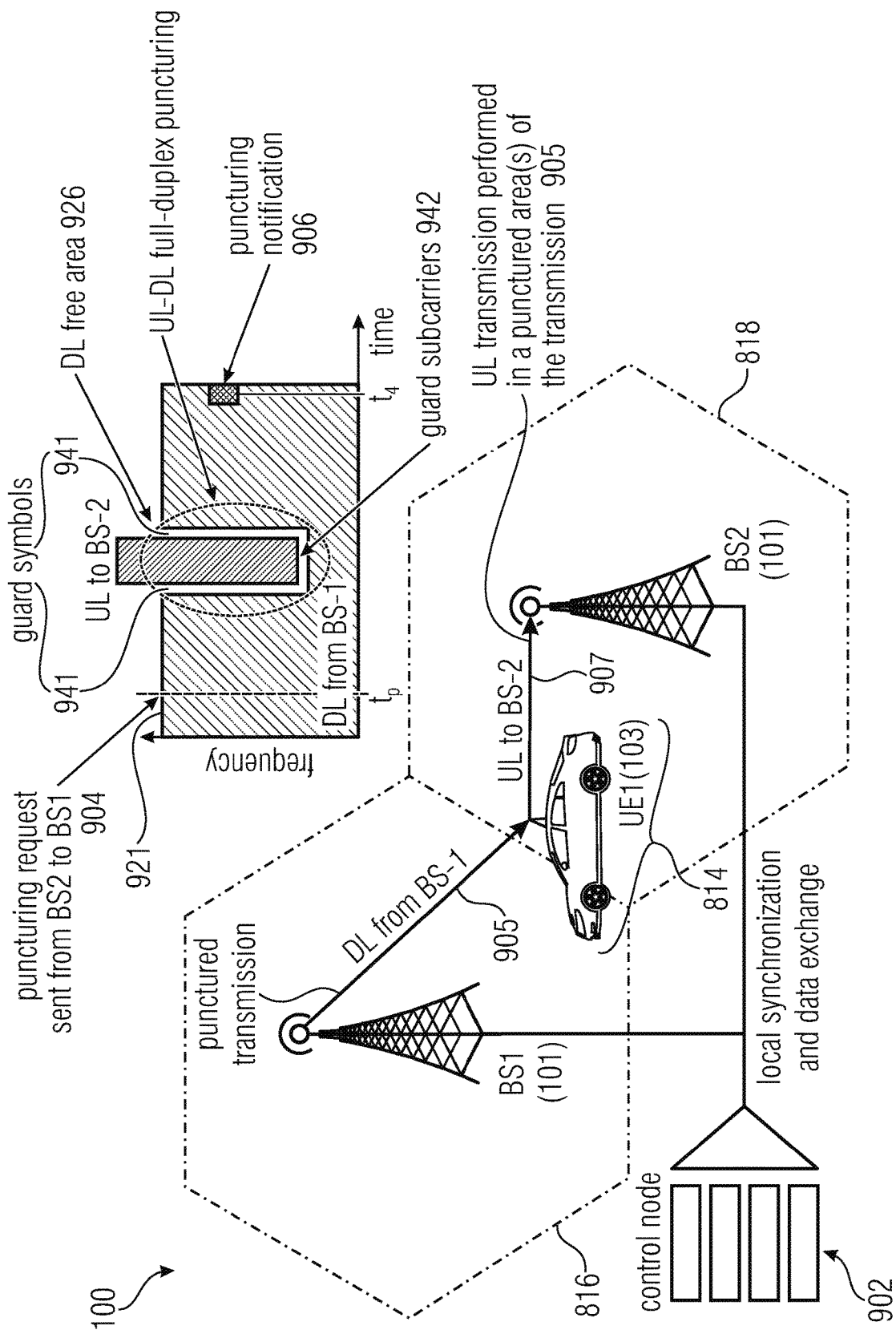
Figures 3, 9:
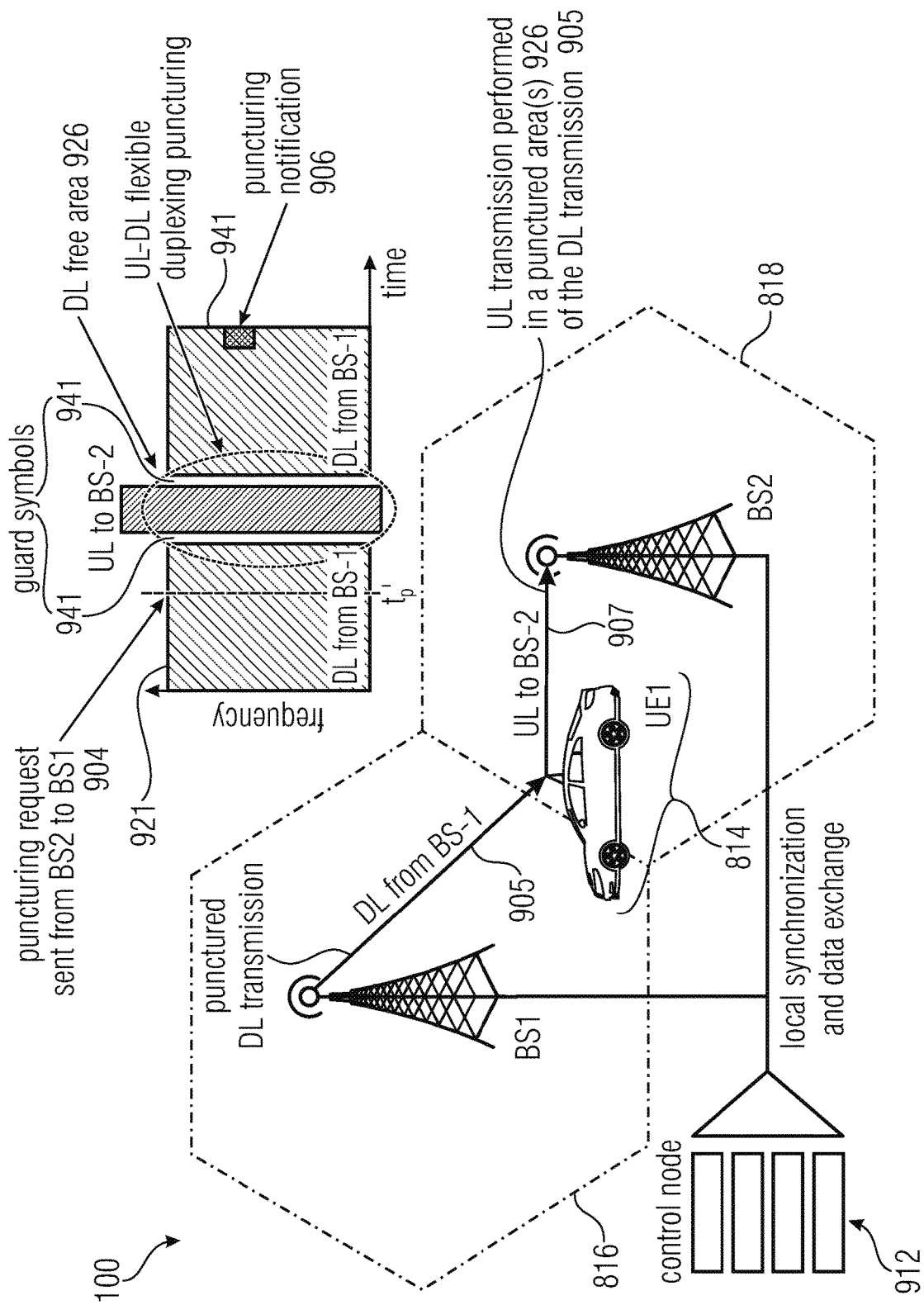
Figures 4, 9:
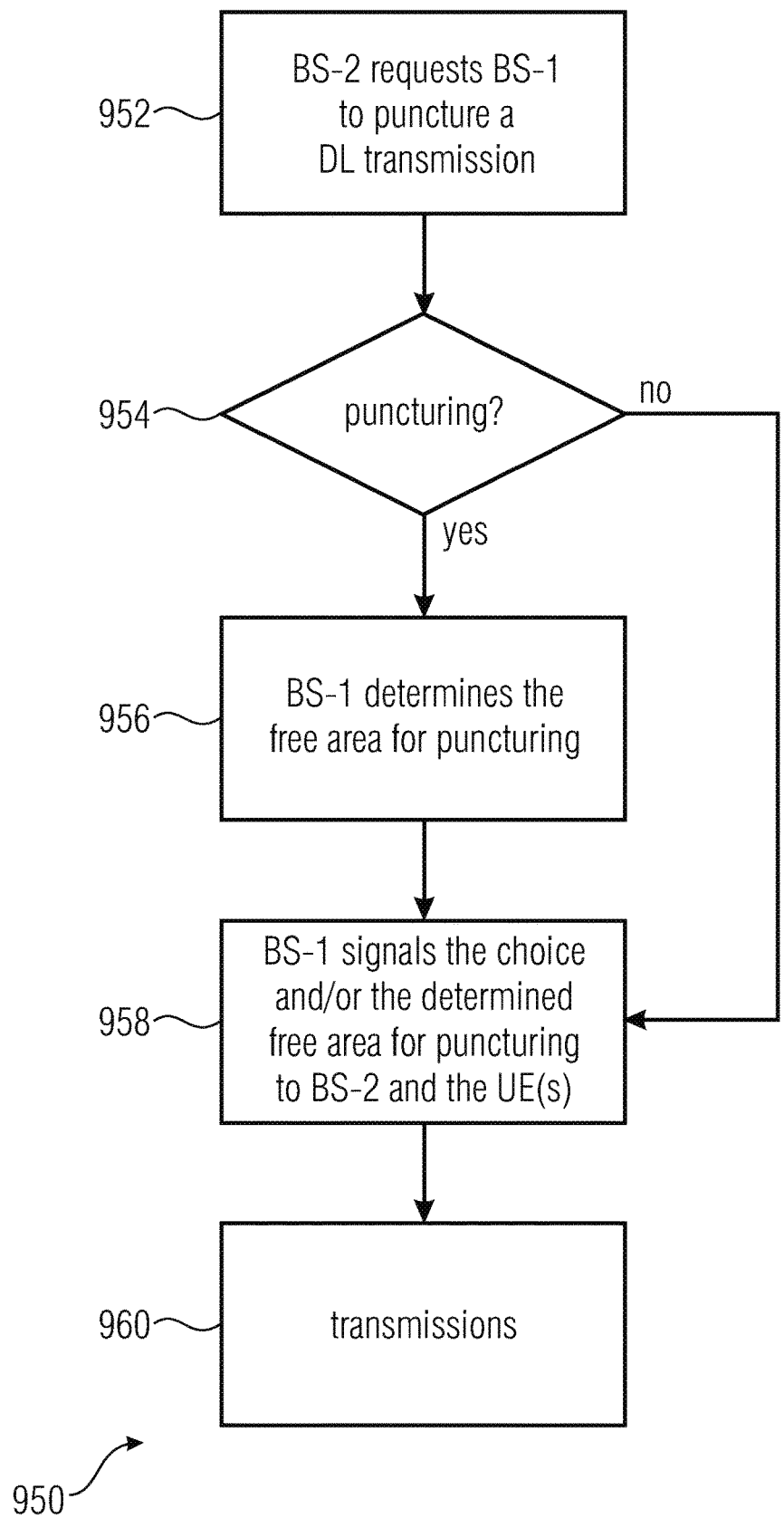

With reference to the Table 1, reference can be made to FIG. 7-1(a), which refers to configuration 1: after the subframe (SF) SF5 (which is scheduled for DL by virtue of the chosen configuration 1), the DL stops for at least three subframes (one special subframe S, and two UL frames). Hence, an urgent UL transmission is blocked for the time that may be taken for at least three time periods. In FIG. 7-1(b), a scheduling so as to present four consecutive DL subframes, which do not permit an urgent UL transmission.

In the art, several techniques have been attempted. For example:
Full duplex communication;
Half duplex communication, i.e., time-division duplexing (TDD), frequency-division duplexing (FDD);
Frequency/time division multiplexing (FDM/TDM);
Downlink control information (DCI);
Uplink control information (UCI);
Data puncturing in one direction.
Full-Duplex Communication (FDC)
Full duplex communication (FDC) may be performed, for example, by a BS if it is capable of performing a UL transmission with a first UE and, simultaneously, a DL transmission with the first UE or with another UE. FDC may be performed, for example, by overlaying, in some scheduled slots (UL or DL slots), some transmission in the opposite direction (e.g., overlaying DL symbols in UL slots and/or overlaying UL symbols in DL slots). Besides resources (frequency bands, time slots . . . ) which have been pre-allocated by a pre-existing scheduling, the same resources may be used (e.g., in different direction), for the overlaid communication of the BS with an additional UE, for example.

FDC may be performed, for example, by a UE if it is capable of performing a UL transmission with a first BS and, simultaneously, a DL transmission with the first BS or another BS. FDC may be performed, for example, by overlaying, in some scheduled slots, some symbols in the opposite direction (e.g., overlaying DL symbols in UL slots and/or overlaying UL symbols in DL slots). Basically, the pre-existing scheduling may be integrated with additional transmissions/receptions which were not originally allocated.

Therefore, a subframe which according to the original scheduling should be an UL (or DL, respectively) subframe may be actually also used (e.g., rescheduled or "on-demand scheduled") for a DL (or UL, respectively) transmission. For example, in the same subframe, different frequencies may be used for overlaying transmissions in different directions. In some cases, in the same subframe (or more in general in the same slot), the same frequency may be used for overlaying transmissions in different directions.

For example, one single BS could perform, in the same time slot and at the same frequency:

a first, UL transmission from a first UE (UE1);
a second, DL transmission, towards a second UE (UE2).

If a UE has FDC capabilities, it could perform, in the same time slot and at the same frequency:

a first, UL transmission towards a first BS (BS-1);
a second, DL transmission, from a second BS (BS-2).

In general terms, the use of the same time slot (e.g., subframe) and frequency band for communicating with two different devices (UEs or BSs) at the same time may generate unwanted self-interference. However, in case of necessity of transmitting/receiving urgent data, an amount of self-interference may be sometimes accepted. Fitters are notwithstanding known for reducing self-interference.

Figure 5:
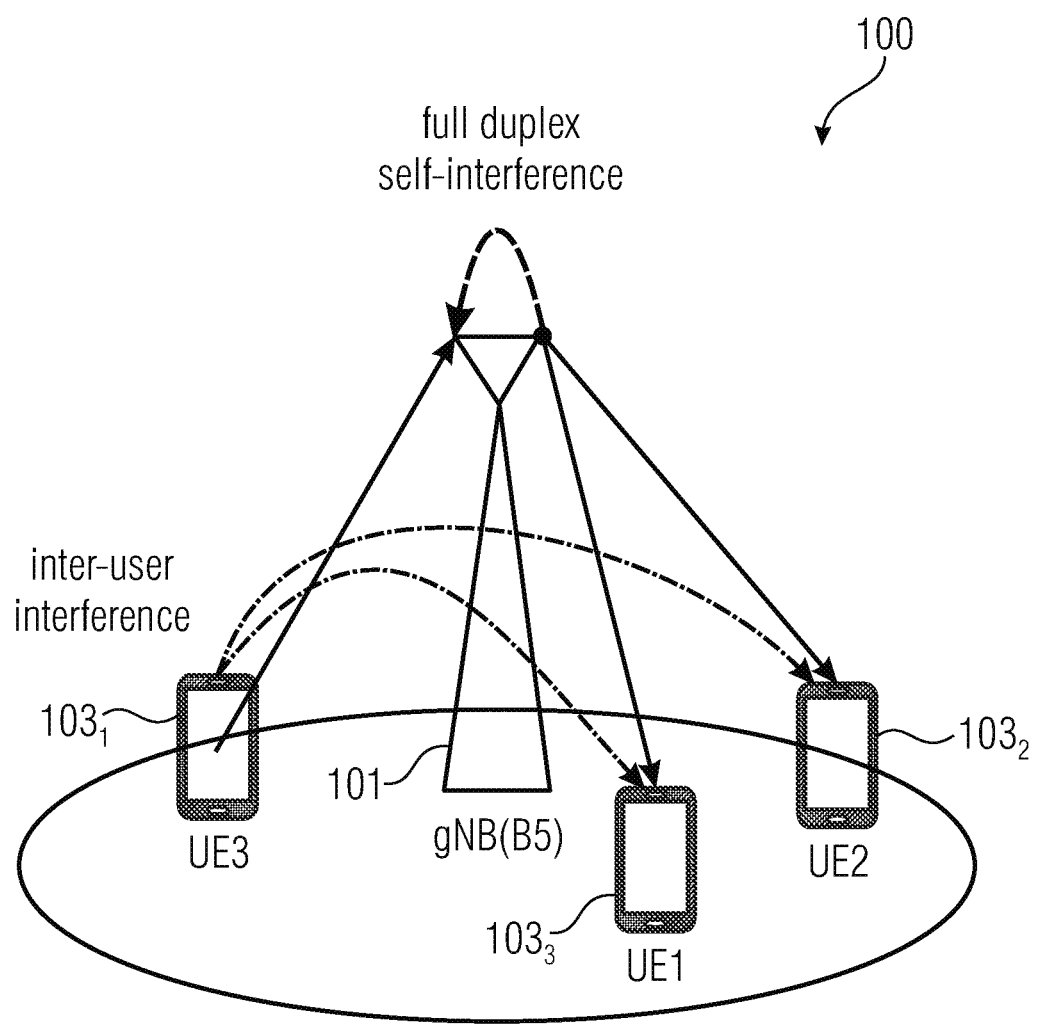
FIG. 5 shows an example, of network.

FIG. 5 shows a system 100 in which three users (UEs) 1031, 1032 and 1033 are transmitting within the same band, i.e., user 2 (UE 2) 1032 and user 3 (UE 3) 1033 are receiving a DL transmission frame (e.g., sub-frame, SF) (e.g. from a base station 101 (e.g., gNB)) while user 1 (UE 1) 1031 is transmitting in the UL frame.

In case of urgent low latency services or of on-demand services, FDC may be performed so as to overlay additional, on-demand scheduled transmissions over originally scheduled transmissions (e.g., by overlaying transmissions onto resources originally allocated to different devices, for example). An example is provided by FIG. 10-2: A DL channel 1021 is originally scheduled for a DL transmission 1089 to a UE1 (103). By relying on FDC, the BS (101) may overlay a UL transmission 1088 from UE2 (103) in the area 1026 may be overlaid (e.g., scheduled on demand).

Even if, theoretically, the both the transmissions 1088 and 1089 are performed, in practice self-interference is generated, and at least some data may finally result corrupted.

In examples, overlaying may be performed on demand. For example, the UE may request to operate in overlaying mode and the BS may grant or deny it.

Puncturing

It has been understood than, even relying on capabilities that are commonly used, for example, for FDC (such as the capability of simultaneously transmitting and receiving, in two directions), impairments such as self-interference may notwithstanding be reduced or avoided.

This result may be obtained, for example, by intelligently positioning originally unscheduled transmission with respect to the originally scheduled transmission. For example, void areas in the original scheduling may be identified and/or punctured. Therefore, the original scheduling may be updated to obtain a new, updated scheduling which permits the exchange of on-demand (e.g., urgent) transmissions without suffering from self-interference.

Figures 1, 10:
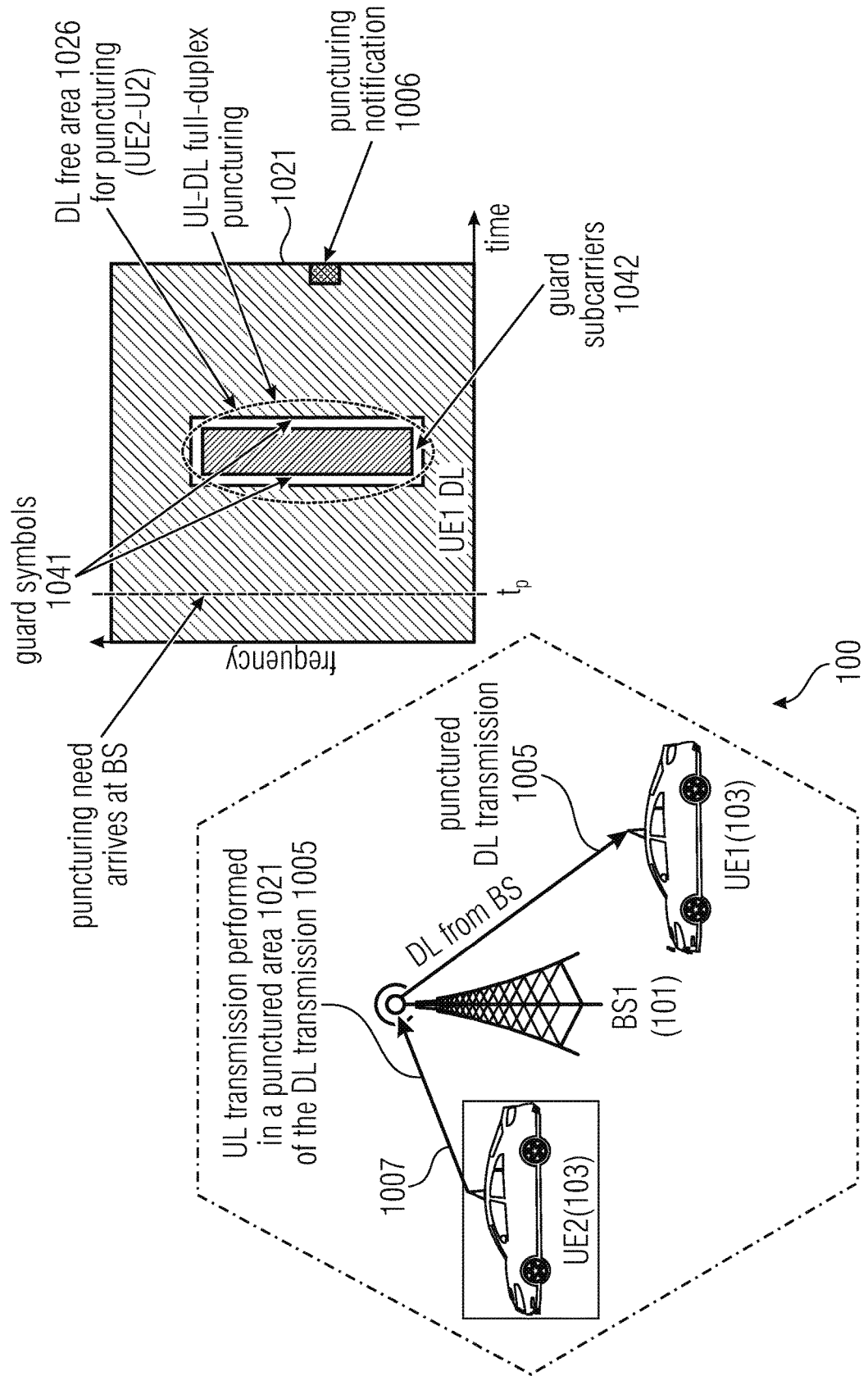
Figures 2, 10:
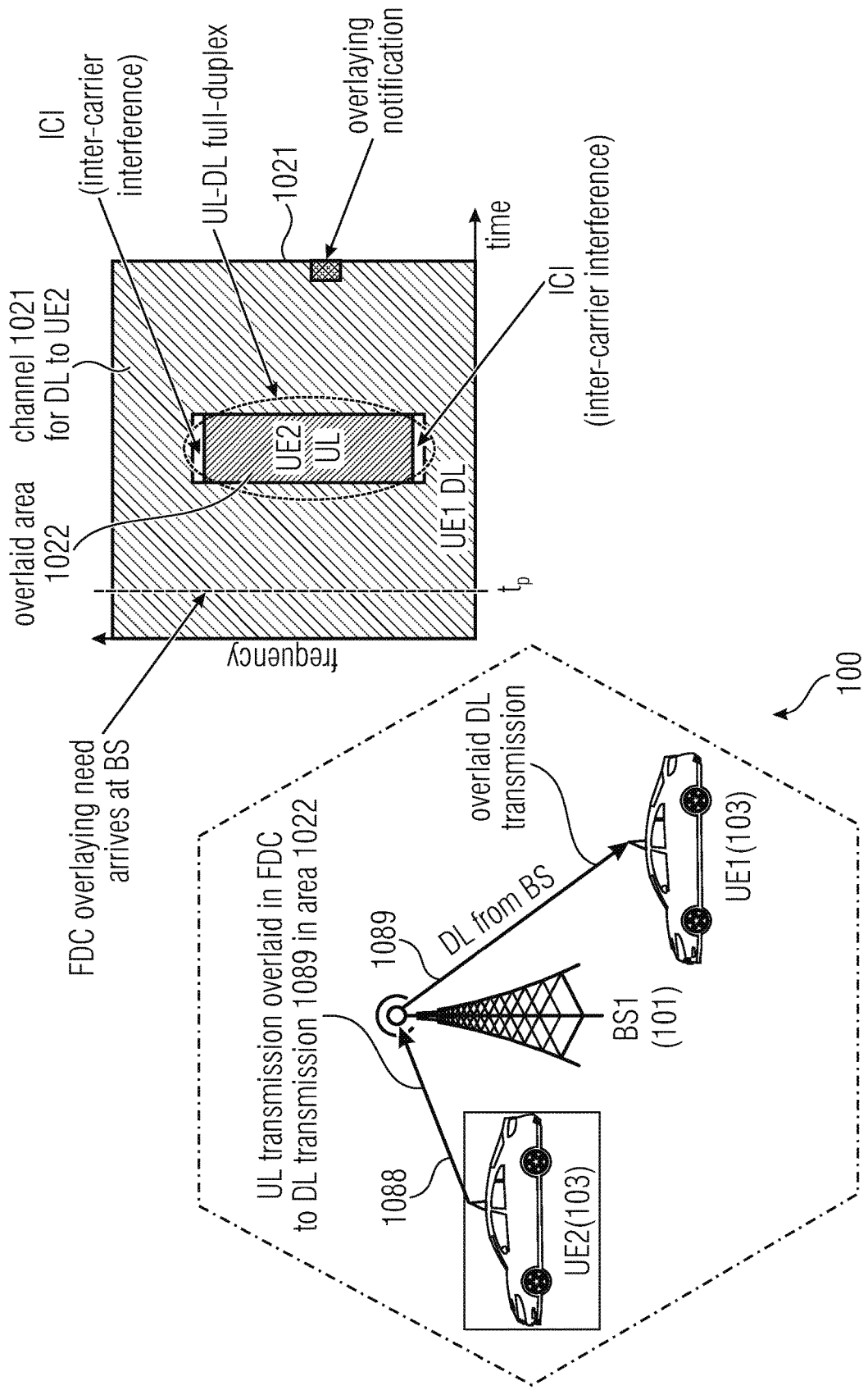

FIG. 10-1 shows an example of strategies that permit to reduce self-interference. BS1 (101) performs an originally scheduled DL transmission 1005 towards UE1 (103), while BS1 receives a DL transmission 1007 from UE2 (103). The channel 1021, which according to the original scheduling is allocated to the DL transmission 1005, is punctured (e.g., by on-line modifying the scheduling), so as to obtain a free area 1026 for permitting the unscheduled UL transmission 1007. By puncturing the pre-scheduled channel 1021, it is therefore possible to give space to the on-demand UL transmission 1007.

The BS (transceiver) 101 (can be configured to puncture a downlink, DL, transmission 1005 of payload information to UE1 in a channel 1021 allocated to the DL transmission 1005 of payload information, to obtain within said allocated channel 1021 for the DL transmission 1005 of payload information a DL free area 1026 for an uplink, UL, transmission 1007 of UE2.

In embodiments, the UL transmission 1007 can be performed simultaneously to the DL transmission 1005 of payload information without causing self-interference, since the UL transmission 1007 is performed only in the punctured area 1026 (e.g., a punctured resource block, punctured resource elements, or a punctured block of symbols, such as OFDM symbols) of the DL transmission 1005 of payload information.

The results above may be generalized.

Instead of UE1 and UE2, for example, there is the possibility of having internet of things, IoTs devices.

Subsequently, embodiments of the BS and UE(s) are described in detail.

The same results of FIG. 10-1 may be obtained in the reversed direction. In that case, the UE may puncture an UL transmission of payload information (e.g., from a UE to the BS) in a channel originally allocated to the UL transmission of payload information, to obtain (within said allocated channel originally for the UL transmission of payload information) an UL free area for a DL transmission.

In examples, the UE may signal a request for an urgent or on demand (e.g., originally unscheduled) transmission (e.g., a UL transmission), and the BS may grant or deny the request and puncture or overlay a DL transmission for permitting the urgent or on demand UL transmission. After that, the BS will signal the decision to the UE with a puncturing or overlaying indication information.

In examples, the UE may signal a request for an urgent or on demand DL transmission, and the BS may grant or deny the request. The BS may signal the decision to the UE with a puncturing or overlaying indication information. After that, the UE will puncture its UL transmission as requested in the puncturing or overlaying indication information.

In examples, the BS may decide an urgent or on demand DL transmission, and the BS may signal the decision to the UE with a puncturing or overlaying indication information. After that, the UE will puncture its UL transmission as requested in the puncturing or overlaying indication information.

In examples, the BS may decide an urgent or on demand UL transmission, and the BS may puncture its DL transmission and signal the decision to the UE with a puncturing or overlaying indication information. After that, the UE will perform the UL transmission in the free space provided in the punctured DL area.

Embodiments tackle the case when a downlink (DL) transmission can coexist with an UL (UP) transmission in the same frequency band/time and vice versa. Hence, the coexisting UL/DL resource or frame (in term of time and frequency) ratio can be variable from 0 to 100%. In this case, embodiments provide a methodology and technique to empty/puncture/evacuate the legacy payload information in DL to accommodate an UL transmission without considering any inter-user interference or vice versa. In this case with no major interference on the UE, only the BS is assumed to support full duplex communication.

In embodiments, for punctured/emptied/evacuated payload information, the user equipment(s) has (have) to be informed about the puncturing using a suitable indication. The indication can be embedded in the DL payload information/the remaining payload information/a dedicated part of the payload information.

In embodiments, If Dynamic puncturing is not supported, an offline/pre-configured/data-base-based payload information shall be considered where the UE knows exactly the puncturing pattern forehand.

In embodiments, for the UL payload information, the UE can select to send the UL payload information during the dedicated grants for UL payload time and frequency period. Another solution is to consider UL payload information during the granted UL transmission period/frequency, i.e., in-band/in-data UL-payload information. The UL payload information can also coexist with DL data or payload if needed. In other case, the UL payload information can be transmitted in dedicated frequency bands, or based on traffic and use-cases needs; this can be decided centrally or based on distributed fashion.

Note that, embodiments also relate to an UE supporting full-duplex, as described in further detail below.

In embodiments, operations of UEs may be exchanged with each other.

In examples, punctured areas are evacuated to keep space for the on demand (e.g., urgent) transmissions. In some cases, instead of and/or besides puncturing, unutilized areas may be found (e.g., areas which are not scheduled, and therefore are free, may be rescheduled for on-demand transmissions). The BS may decide the advantageous option.

Basically, the BS may decide in three different ways:
an overlaying decision (e.g., simultaneous UL and DL transmissions at the same frequency);
identify a void area in the UL and DL transmission (so that the on-demand transmission finds space in the void area, hence without overlaying and without necessity of puncturing);
a puncturing decision (so that a punctured transmission is identified to be evacuated, giving space to the on-demand transmission).

In general terms, whether a puncturing is actually performed or a free area in the scheduling is identified for performing a transmission in the opposite direction (autonomously or on demand), this may be understood as "operating in puncturing mode". In case of overlaying, this may be understood as "operating in overlaying mode".

In examples, it may be possible to operate so that a free area (UL or DL) is determined, so that the determined free area is identified as useful for the transmission in puncturing mode.

In examples, each UE may be configured to increase the power in case of operating in puncturing mode: no self-interference is caused, as none of the other UEs is transmitting at the same frequency in the same time slot. In other cases, the BS may be configured to reduce the DL power in case of operating in puncturing mode.

In examples, puncturing mode may be performed on demand. For example, the UE may request to operate in overlaying mode and the BS may grant or deny it (or permit overlaying, for example).

Choice Between Puncturing Mode and Overlaying Mode

As explained above, puncturing may be performed by making use of techniques typical of FDC, such as transmitting in different directions simultaneously. However, while the traditional FDC is based on overlaying an on-demand transmission over a pre-scheduled transmission (which may cause self-interference) the alternative approach is to puncture the pre-scheduled data so as to obtain a free area for the on-demand transmission.

In embodiments, the decision between puncturing and overlaying may be determined on-the-fly (e.g., in real time).

The BS 101 may decide the use of one or both the techniques to manage UL and/or DL urgent transmissions and/or on-demand transmissions.

In embodiments, overlaying and/or puncturing may be chosen by the BS 101. The BS 101 may decide the use of FDC and/or puncturing on the basis of a selection, for example. In embodiments, some UEs or some transmissions are high-priority UEs or transmissions. High-priority UEs may be, for example, UEs associated to premium abonnements or UEs associated to authorities, such as police, firefighters, etc., with low-latency requirements. High-priority transmissions may be, for example, PDSCH and/or PUSCH transmissions.

In embodiments, the overlaid area and/or the free area for puncturing may be determined by the BS 101. The BS 101 may choose the coordinates (e.g., time slot, frequency band . . . ) of the area to be overlaid and/or the area for puncturing, for example. It is noted that, if, by controlling the pre-scheduled resources, a non-used area is found in one channel, the free area may be chosen (and no puncturing is even necessary). In case of non-finding any non-used area, the BS 101 may puncture an area used by a particular UE, so that the particular UE ceases to send a transmission on the punctured area, so that another UE (which has to transmit or receive an urgent data) may make use of the punctured area. A similar process may be performed for overlaying, even if in this case it is not necessary to render silent one particular UE: simply, an additional UE (which needs to transmit or receive urgent data) will make use of the same channel, the same frequency and the same time slot (but, in general, different directions).

Figure 6A:
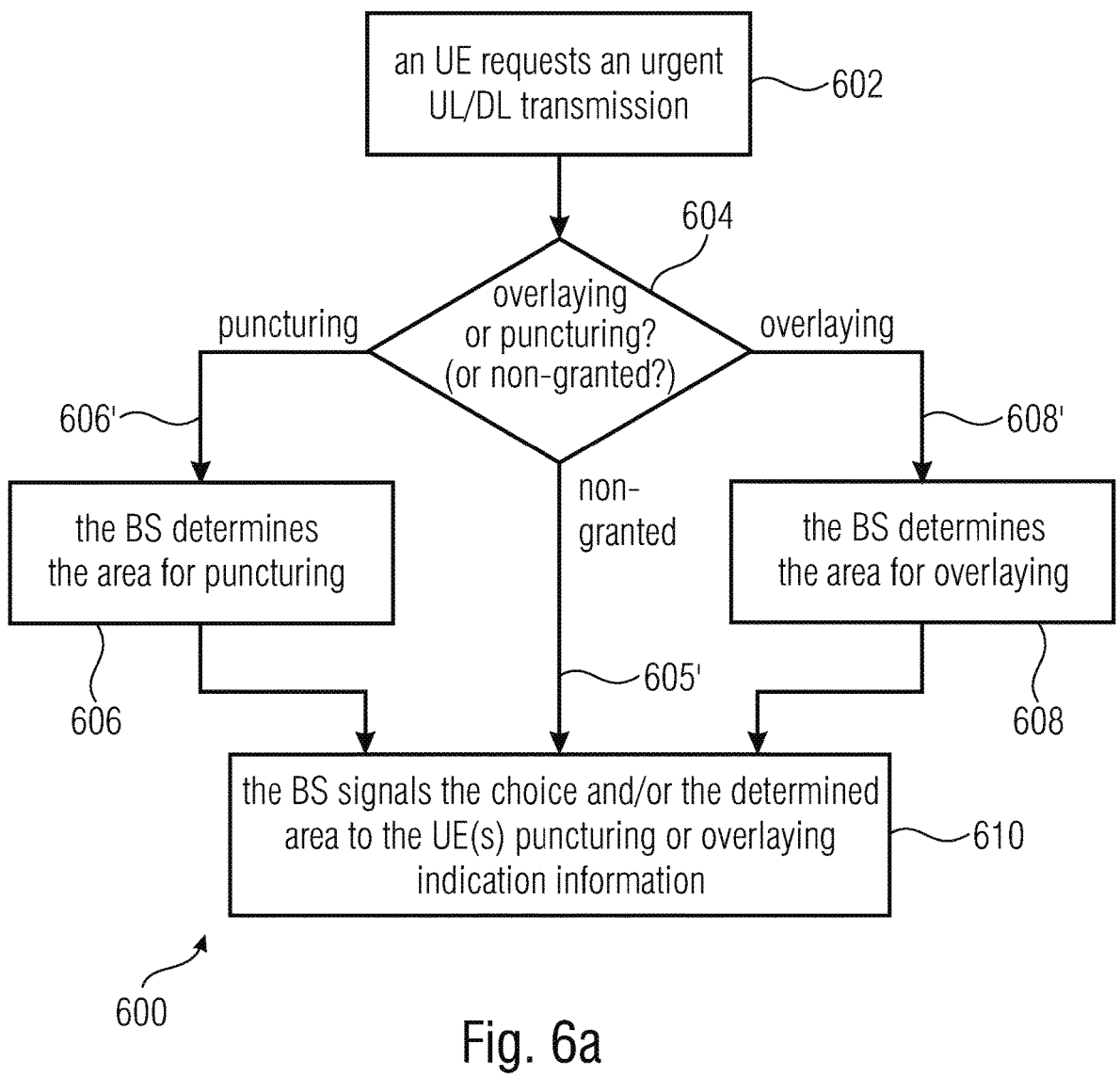
FIGS. 6a and 6b show examples of procedures.

FIG. 6a shows an operation 600 according to embodiments. The operation 600 may be performed in real-time, during normal UL/DL communications. At step 602, a UE may request an urgent or on-demand transmission/reception. For example, the UE may signal the request with a particular control message, indicating the necessity of an urgent or on-demand UL and/or transmission. In embodiments, the control message may contain, for example, information regarding the overlaid/punctured payload to be transmitted/received with FCD.

After having received the request, the BS may choose, at step 604, whether to:
Accept the request (606', 608'); and
Refuse the request (605').

The decision at step 604 may be based, for example, on particular criteria, such as an external selection, data associated to the UE (e.g., regarding a particular abonnement and the quality of service associated to the abonnement) or the like. In examples, the criteria may consider at least one of the current scheduling, the current payload, metrics associated to the current state of the network (e.g., channel quality information, signal to noise ratios, etc.), statistical and/or average values involving the communications with the UEs, predictions, estimations, and so on.

In case of acceptance of the request, the BS may choose (on the basis of the same or different criteria) whether to perform overlaying or puncturing. The choice may be based, for example, the current scheduling, the current status of the network, estimations, predictions, metrics, selections, data associated to the UEs, and so on.

At step 606, the BS may determine the area for puncturing. The area may be an area found in the original scheduled scheme of communication. The free area may be defined on the basis of coordinates such as:
time (e.g., time slot);
frequency (e.g., a particular band);
frequency (e.g., some carriers within the particular band, e.g. a sub-band).

If the area identified by the BS is currently occupied by a DL and/or UL communication with a UE (e.g., a different UE), this information may be signalled to the UE at step 610.

In alternative to step 606, at step 608 the BS may determine the area to be overlaid. The BS may also determine a second UE which will transmit or receive in FDC with the UE which has requested the urgent communication. The overlaid area may be defined on the basis of coordinates such as:
- time (e.g., time slot) (the granularity of time may be indicated with number of symbols, such as OFDM symbols, that may be transmitted/received for each slot);
- frequency (e.g., a particular band);
- frequency (e.g., some carriers within the particular band, a sub-band).

It may be useful (e.g., at step 610) to signal (notify) this information to the UE which has requested the urgent communication. In embodiments, it is also possible to notify the overlaying mode to the second UE, so that the second UE may operate accordingly (for example, the second UE may reduce power, so as to reduce self-interference).

At 610 a puncturing indication information or an overlaying indication information notifies the decision (whether to puncture or overlay) and the coordinates (e.g., frequency/time slots of the free area for puncturing and/or the area for overlaying), e.g., with a puncturing or overlaying indication information.

In general terms, the overlaying is alternative to puncturing. However, in some cases, a puncturing operation is performed on a first area, while FDC is performed on a different area. Therefore, FDC and puncturing may coexist, even if referred to different areas.

As explained above, instead of puncturing there is the possibility of identifying a free space (e.g., originally scheduled to be free), so as to perform the on-demand transmission in the free space. In this case, there is no necessity of puncturing, as no originally scheduled transmission needs to be freed for permitting an on-demand transmission.

Figure 6B:
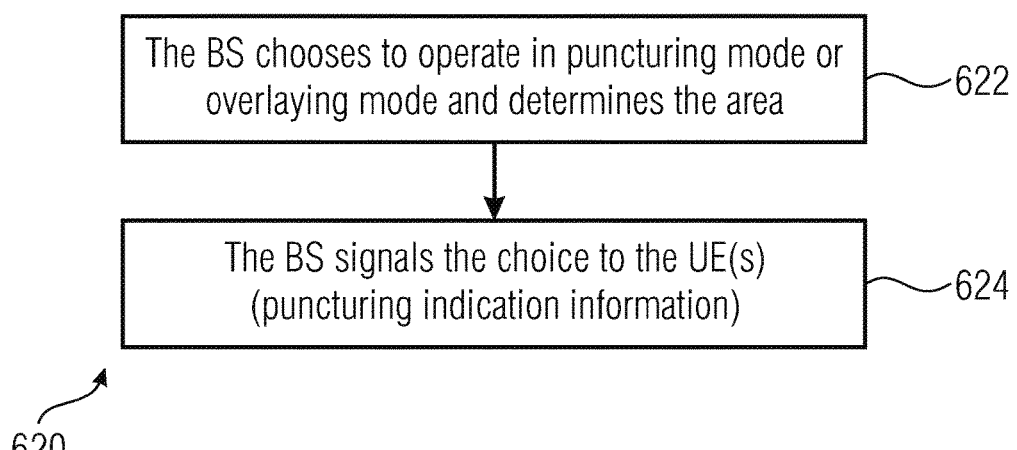

FIG. 6*b* shows a variant 620 in which it is the BS which, at step 622, chooses to initiate to operate in puncturing mode and/or in overlay mode. This choice may be based on criteria, such as criteria considering the original scheduling, the current status of the network, estimations, predictions, metrics, selections, data associated to the UEs, and so on. At step 624, the BS signals its choice (including, in some cases, the coordinates of the area for puncturing and/or the overlaid area for FDC) to the UE(s).

In embodiments below and above, physical channels may include the physical DL and UL shared channels (PDSCH, PUSCH) carrying user specific data (DL and UL payload data). In some cases, the DL frames and/or UL frames and/or S frames are used.

Communication Scenarios

FIG. 7 show in diagrams allocations of the communication channel of the wireless communication network 100. FIG. 7 show examples, of punctured areas and/or overlaid areas for the transmission of payload information.

Figure 3B-1:
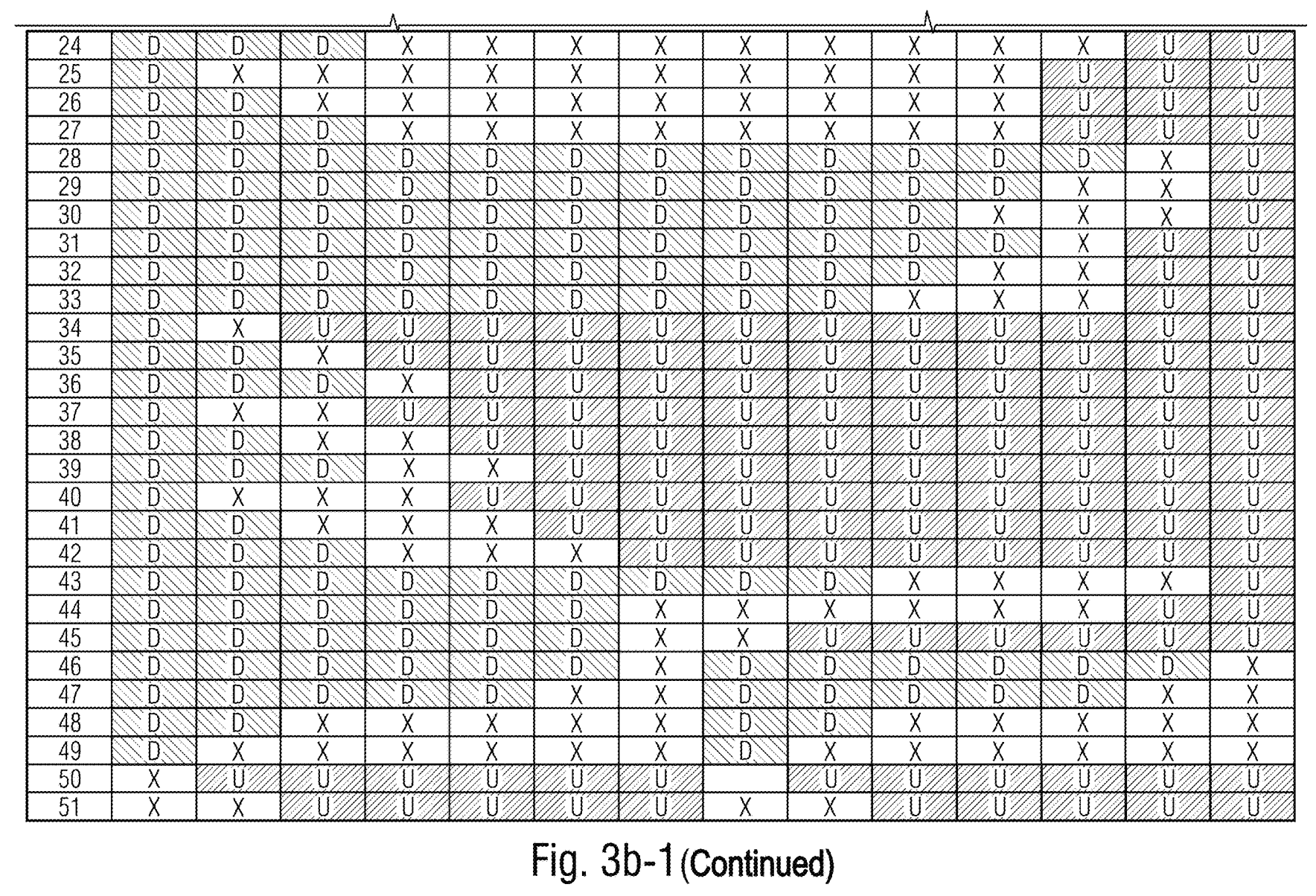
Figure 3B-2:
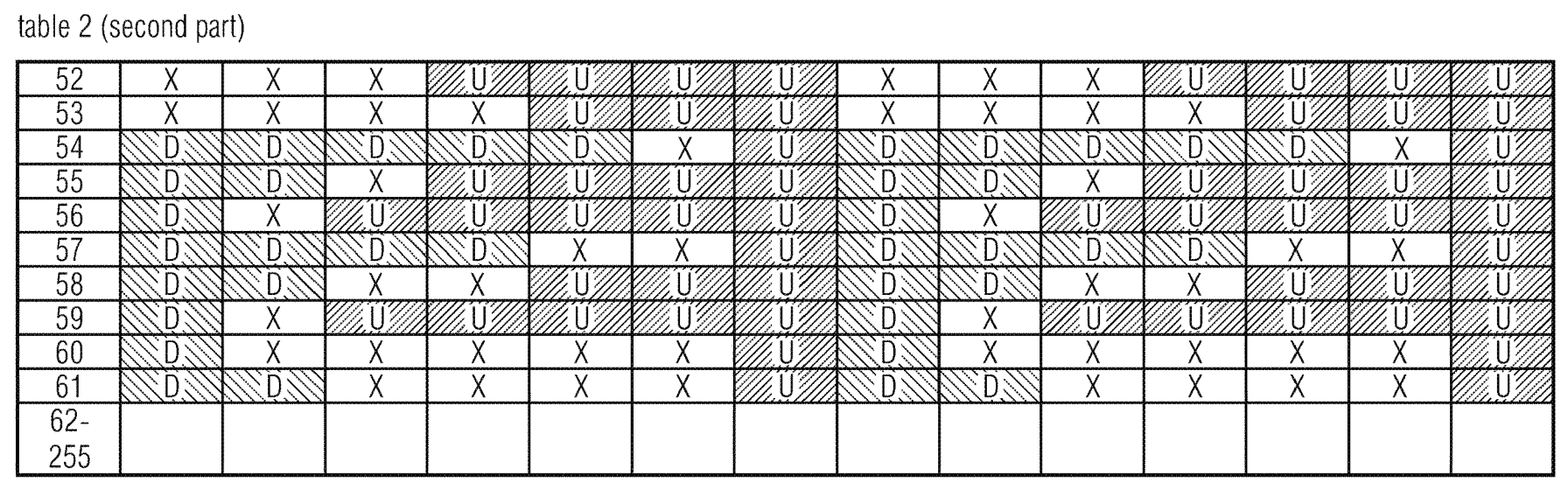

The slots discussed below may be, for example, subframes as in Table 1 (FIG. 3*a*).

FIG. 7-1(*a*) shows a resource allocation according to the configuration 1 (see table 1 above) such that:
- a slot $T_{SF5}$ is originally scheduled for DL;
- a slot $T_{SF6}$ is originally scheduled for a special frame;
- two slots $T_{SF7}$ and $T_{SF8}$ are originally scheduled for UL.

As indicated in the figure, let us assume that an urgent DL transmission may be used at $T_{SF7}$ or $T_{SF8}$. In conventional technology, the transmission would not be possible in $T_{SF7}$ and $T_{SF8}$.

FIG. 7-1(*b*) shows a resource allocation 710 according to the configuration 4 (see table 1 above) such that slots $T_{SF5}$-$T_{SF8}$ are originally scheduled for DL. In conventional technology, if an urgent (on-demand) UL transmission is useful, it is not possible to perform it in $T_{SF5}$-$T_{SF8}$.

FIGS. 7-1 show therefore cases in which techniques proposed in the present disclosure permit to increase the payload in case of need of urgent and/or on-demand communications.

Figure 2:
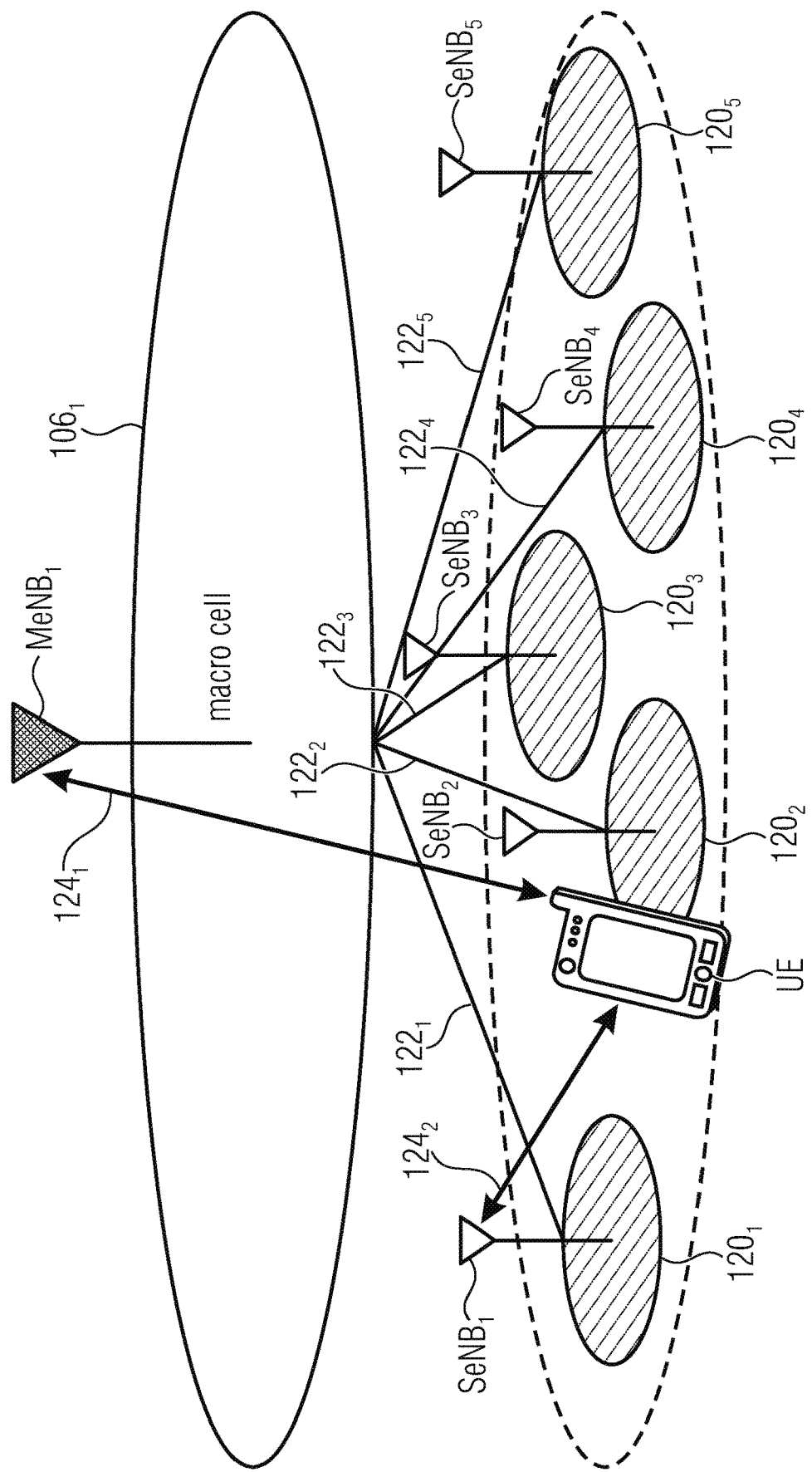

FIG. 7-2 shows an original scheduled allocation 720 (for one particular UE, e.g., $UE_1$) which is distributed between the following bands:
- a band 1 (in the figures indicated as f band) which supports both puncturing and overlaying;
- a band 2 (in the figures indicated as u band) which does not support puncturing and/or overlaying.

The following time slots are shown in FIG. 7-2:
- a first DL slot-0;
- a second S slot-1 (special frame) with DL flexible slots and UL flexible slots;
- a third UL slot-2;
- a fourth DL slot-3.

The resource allocation 720 may correspond to configuration 2 or 5 (see Table 1).

At DL slot-0, an originally scheduled DL area 721 for payload information is allocated by the original scheduling. However, by virtue of FDC (and, for example, determined in real time by the BS, e.g., at step 608 or 622), an overlaid area 722 may be obtained. Therefore, while a first UE receives data in DL, another different UE may transmit data in UL, in the same band, in the same time slot. Notably, the overlaid area 722 does not necessarily cover all the frequencies of band 1: some frequencies over the overlaid area 722 may be in the DL area 721, and/or some frequencies under the overlaid area 722 may be in the DL area 721, for example, according to the determination made by the BS.

At UL slot-2, an original scheduled UL area 724 for payload information may be allocated by the original scheduling. However, by virtue of FDC (e.g., determined in real time by the BS, e.g., at step 608 or 622), an overlaid area 727 may be obtained. Therefore, while a first UE transmits data in UL to the BS, another different UE (e.g., $UE_2$) receives data in DL from the same BS, in the same band, in the same time slot. Even in this case, the overlaid area 727 does not necessarily cover all the frequencies: some frequencies over the overlaid area 727 may be in the UL area 724, and/or some frequencies under the overlaid area 727 may be in the UL area 7241, for example, according to the determination made by the BS.

At DL slot-3, an originally scheduled DL area 721 for payload information may be allocated by the original scheduling. However, an on-demand UL transmission 725 may be assigned to a first UE for an urgent transmission.

Notably, the on-demand UL transmission may be performed in an unutilized area 726. In some cases, the unutilized area 726 may be originally scheduled as a free area (e.g., by virtue of a low traffic). Therefore, even without puncturing, the free area 726 may be identified and the on-demand urgent or on demand transmission 725 may be performed in the unutilized area 726.

While the FDC transmissions in areas 722 and 727 may cause self-interference at the BS, the UL transmission 725 (in the identified free space 726) does not cause self-interference.

Figures 3, 7:
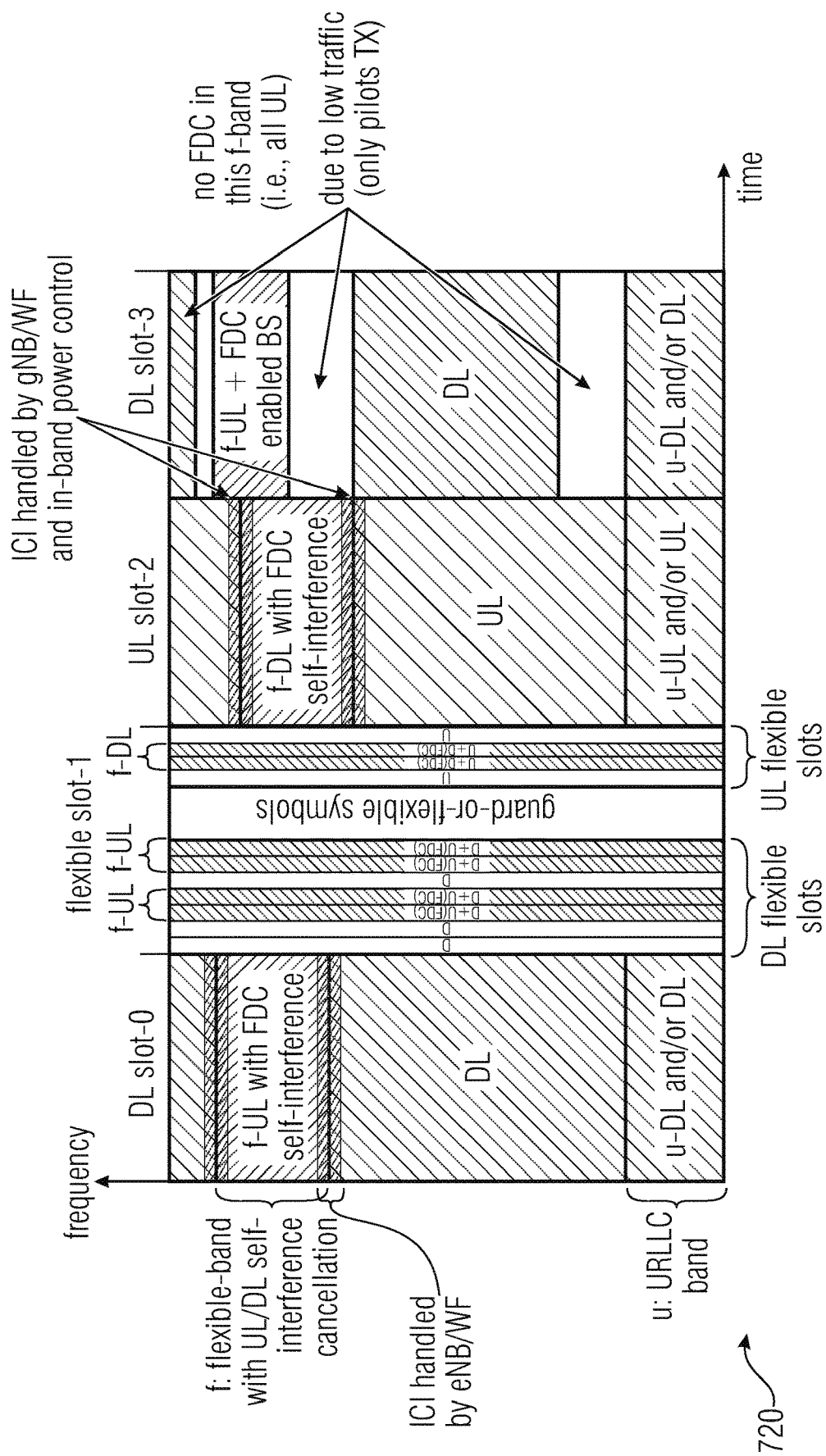

With reference to FIGS. 7-2 and 7-3, it is shown that there is the possibility of defining DL flexible slots and/or UL flexible slots.

Figures 4, 7:
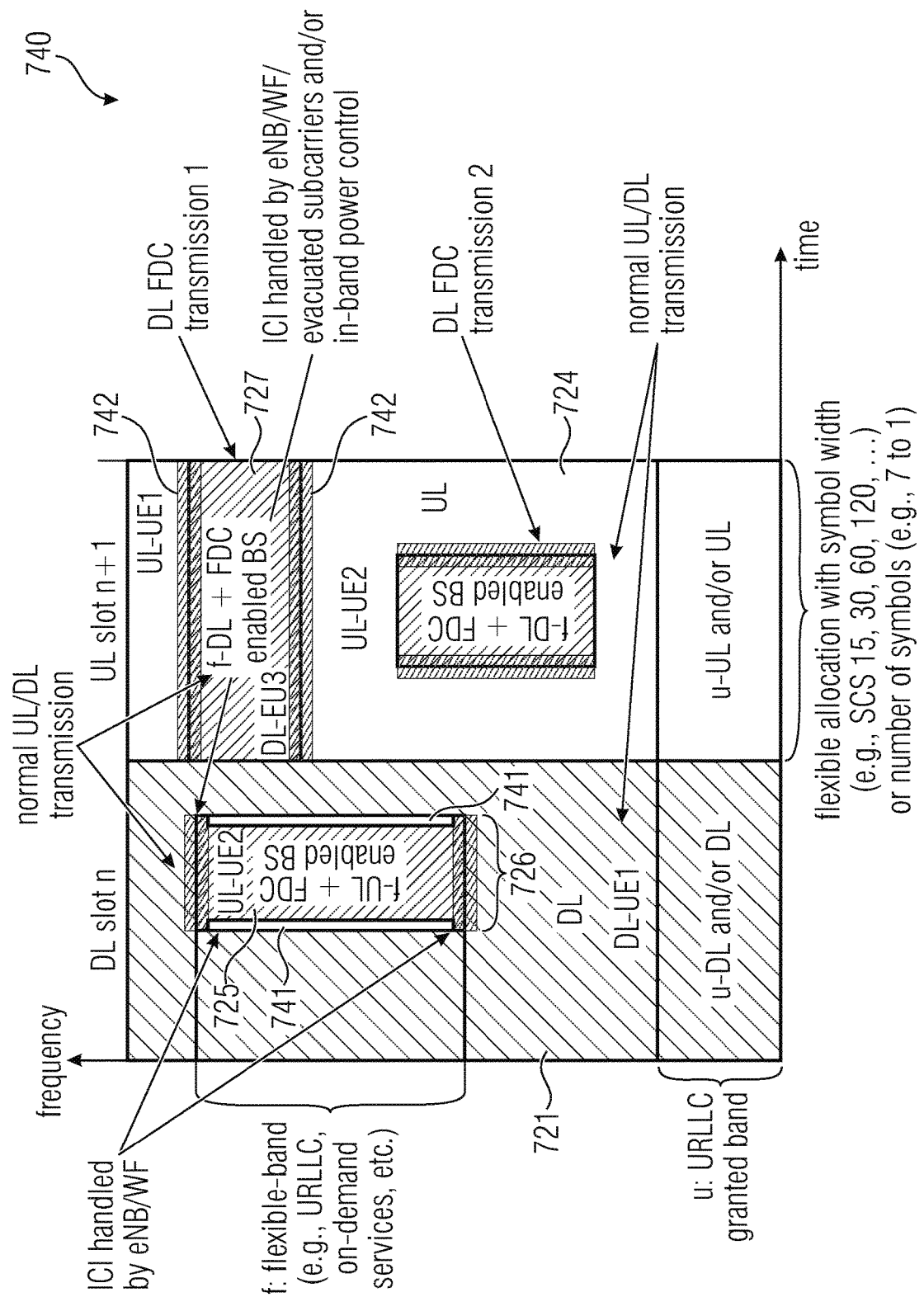
Figures 5, 7:
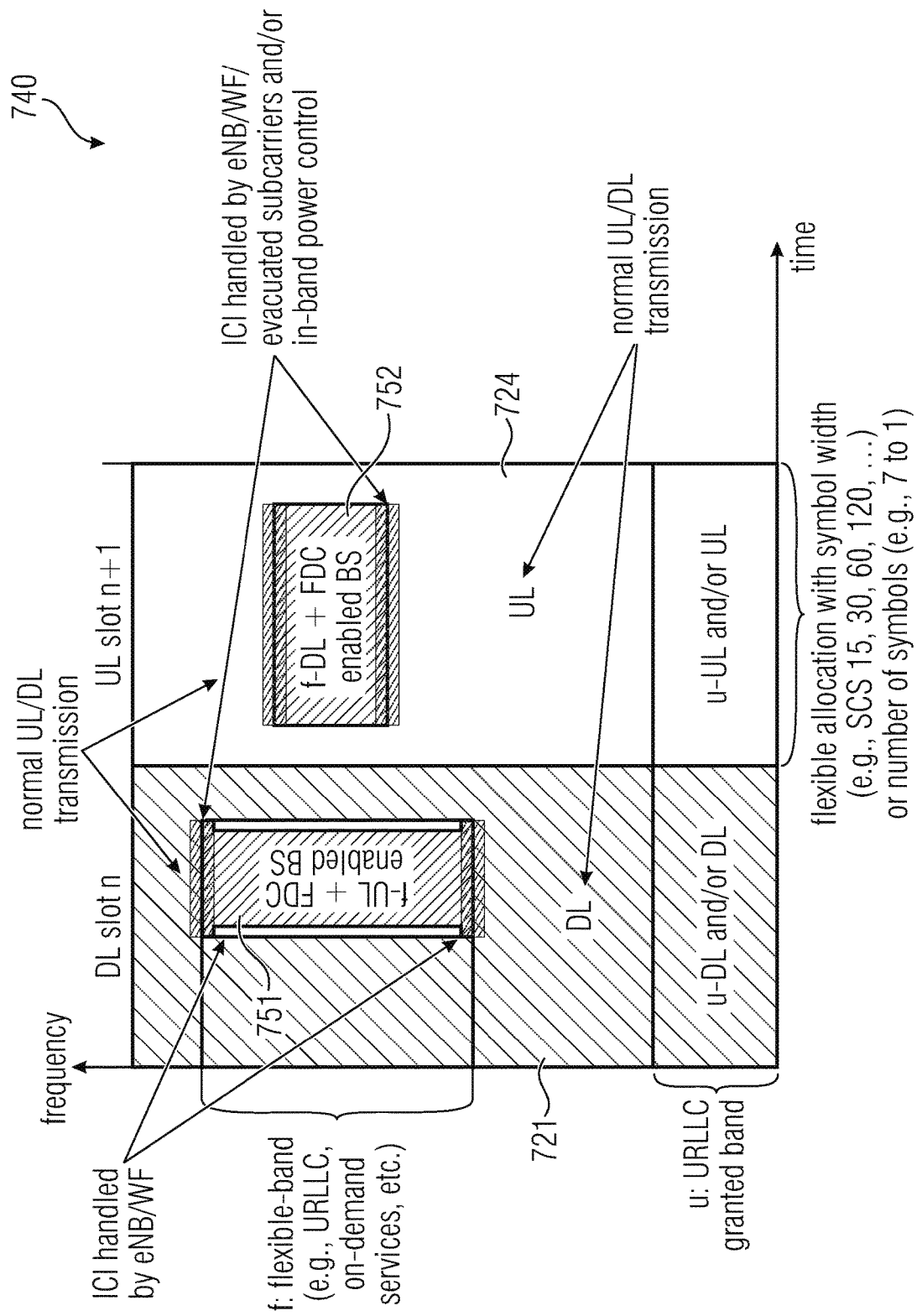

FIG. 7-4 shows a resource allocation 740 with an originally scheduled DL slot n followed by an originally scheduled UL slot n+1. An area 726 for puncturing is identified on-the-fly for performing an UL transmission 725 within the slot n (which was originally scheduled for a DL transmission 721). In this case, the area 726 does not cover all the frequencies and all the time instants of the DL slot n. Notably, while a first UE transmits data in UL, no other UE transmits data at the same time and at the same frequencies. Further, in area 726, the BS refrains from transmitting any data in DL to $UE_1$. The shape and the dimensions of the area 726 may be defined by the BS (e.g., at step 606 and/or at step 622, for example).

Guard symbols 741 may be defined for taking into consideration timing tolerances. For example, each tolerance slot 741 may have one or two one OFDM symbol width.

At UL slot n+1, guard bands 742 may be provided, so as to reduce interference between UL transmission 724 and the DL transmission in area 727. In the guard bands, no data are transmitted.

FIG. 7-5 shows the resource allocation 740 in which, however, the DL transmission 721 at slot n and the UL transmission 724 at slot n+1 are overlaid in FDC by an UL transmission 751 and a DL transmission 752, respectively. Here, no puncturing has been performed. Self-interference may arise.

Figures 6, 7:
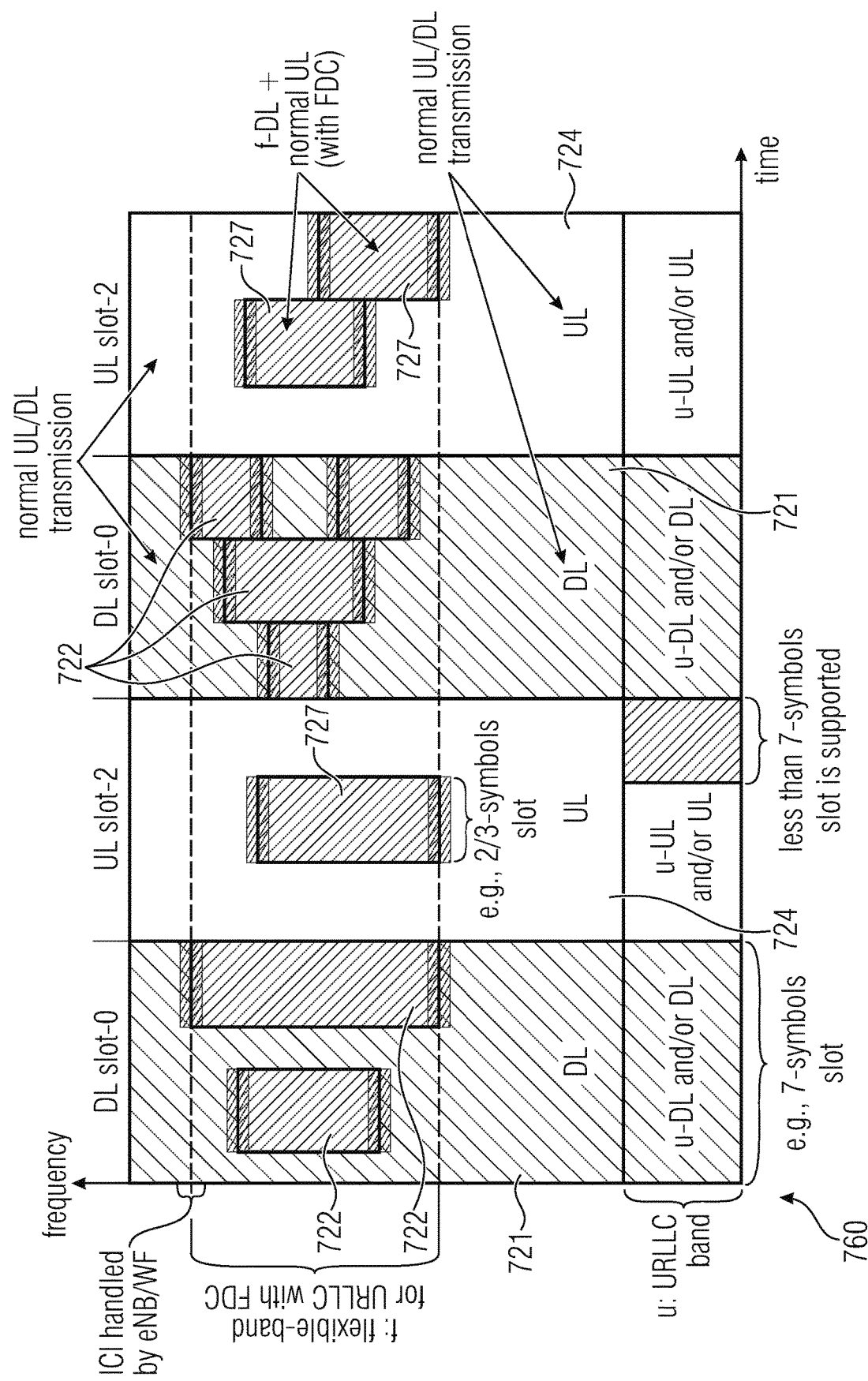

FIG. 7-6 shows a resource allocation 760 with areas 721 (originally scheduled for DL) overlaid by areas 722 for UL, as well as areas 724 (originally scheduled for UL) overlaid by areas 727 for DL. Notably, there may be more than one overlaid areas and/or punctured areas for each slot (according to the BS's decisions as carried out in steps 608 or 622). Here, no puncturing has been performed. Self-interference may arise.

In several embodiments, the BS, when signalling (e.g., at step 610 or 624) the choice of the puncturing or FDC, will therefore transmit a control signal (notification or indication) containing the following information:
- information regarding the choice of FDC or puncturing; and/or
- if the BS's choice is positive:
  - information whether FDC or puncturing has been chosen;
  - information regarding the UE(s) for which data are punctured and/or the UE(s) that obtain the additional DL or UL resource; and/or
  - information regarding the band (e.g., band 1 or band 2) for which the puncturing or FDC is performed; and/or
  - information regarding the particular slot in which the punctured or overlaid areas are to be positioned (e.g., slot-0, slot-1, slot n, slot n+1 . . . ); and/or
  - information regarding the frequencies of the punctured or overlaid area (e.g., the upper and/or lower boundaries of the frequencies for areas 721, 727, 726); and/or
  - information regarding the time position of the punctured or overlaid area within one slot, for example indicated in symbols (e.g., the left and/or right boundaries of the frequencies for area 726 in FIG. 7-4); and/or
  - information regarding the time tolerance slot or guard times or guard symbols 741 (e.g., the width, for example in symbol number); and/or
  - information regarding the frequency tolerance slot or guard subcarriers 742 (e.g., the non-used frequency band between the originally scheduled transmission and the overlaid or puncturing transmission).

Discussion on the Present Solution

The here disclosed techniques mainly tackle cases when a downlink (DL) transmission can coexist with an uplink (UL) transmission in the same frequency band and vice versa. Hence, the coexisting ratio can be variable from 0 to 100%; on frequency resources. In this case, our solution describes a methodology and technique to interleave information in, e.g., DL to be accommodated onto, e.g., UL transmission. This can be via Full-Duplex coexistence or (together) with FDM resources. For one case, only the BS is assumed to support full duplex and or flexible duplex communication.

At least some idea incentives of the present techniques comprise:

1. Band 1; the flexible-band with UL/DL flexibly or full duplexed: the BS may schedule traffic over the allocated band(s) [in one or more of the paired spectrum (in case of FDD) or the unpaired spectrum (in case of TDD)] with full and or flexible duplex considering the following (see FIG. 7-2 for more details):
   a) The base-station may allow full duplex in one or more of the transmission bands. The overlaid UE (transmitting in one direction) may be frequency multiplexed in the opposite transmission direction. The Full duplexed band may be 0 to 100% of the transmission band. The number of multiplexed UEs may be arbitrary.
   b) Similar to the a); however, e.g. if the full duplex is not possible, then the base-station can puncture the DL transmission direction allowing one (or more) UEs to send their UL transmission in the whole slot duration or partially over a short slot transmission. Percentage of puncturing in time and frequency may be arbitrary from 0 to 100%. It worth to mention that if the base-station is not full duplex capable, puncturing is done over a certain time-slot t overt the whole frequency band; i.e., only half-duplex is supported in this slot.
   c) The a) and b) mechanisms can be combined in time and/or frequency. It can be also based on the eNB capacities.

2. More details about puncturing/overlaying for FDC and puncturing pattern:
   Assumption 1: For DL subframes, either the UL UEs may request an urgent UL transmission or the network assist for transmitting an UL request within the long DL subframe.
   Assumption 2: For UL subframes, either the UE can request an emergency or on demand DL transmission or the network can assist for transmitting a DL urgent transmission within the long UL subframe.
   a) For DL subframe where no-full FDC is supported:
      Upon an emergency request or an on-demand UL transmission, the BS can puncture a DL transmission for a certain number of symbols and a certain number of subchannels in frequency. This can include all the time slot of the DL transmission (see FIG. 7-2 (DL Slot 3) for more details) or partial short-slot (mini-slot, sTTI) as in FIG. 7-4 DL slot-n.

The indication of the punctured time and frequency location can be signaled to the DL UE to overcome decoding of irrelevant punctured data.

The DL UE can skip decoding the punctured location (where UL is transmitted) or do not flush the buffer until a supplementary DL transmission is performed (the punctured data can be retransmitted or extra redundancy version as in a HARQ process can assist the decoding process).

For more semi-static scenarios, a puncturing pattern/bit-maps can be consider to avoid the signaling overhead of sending the puncturing information.

The location of the punctured resources (in time and frequency) has to be selected with a different/variable pattern such that the UEs avoid being punctured on their high signal quality resources.

b) For DL subframe where FDC is supported:

Upon an emergency request or an on-demand UL transmission, the BS can overlay on the DL transmission (for a certain number of symbols and a certain number of subchannels in frequency) an UL transmission in an FDC manner.

This can include all the time slot of the DL transmission (see FIG. 7-2 (DL Slot 0) for more details) or partial short-slot (mini-slot, sTTI) as in FIG. 7-5 DL slot-n.

The BS can inform the UE of the overlaid (similar to the puncturing in the previous context) UL transmission location in time/frequency to consider correct SINR calculations. The DL UE can use this information to enhance the CSI feedback and reduce future DL decoding failure.

For more semi-static scenarios, a FDC overlaid pattern/bit-maps can be consider to avoid the signaling overhead of sending the FDC location (time/frequency) information.

The locations of the overlaid resources have to be selected with a different locations (in time and Frequency) to avoid that FDC happens on the best signal quality resources.

c) For UL subframe where no-full FDC is supported:

Upon an emergency request or an on-demand DL transmission, the BS can send the UL grants (for UL UE) to allow for a puncture time/frequency location for DL transmission For this, a certain number of symbols and a certain number of subchannels in frequency. This can include all the time slot of the UL transmission (see FIG. 7-2 (UL Slot 2) for more details) or partial short-slot (mini-slot, sTTI) as in FIG. 7-4 UL slot-n+1.

For the latter, the UL UEs knows in the previous slot that they have to puncture their UL data before sending over-the-air. The puncturing time and frequency are also conveyed to the UE via the DL Control information.

For more semi-static scenarios, a FDC overlaid pattern/bit-maps can be consider to avoid the signaling overhead of sending the FDC location (time/frequency) information.

Also frequency and time hopping in the pattern is supported to enhance performance as before.

d) For UL subframe where FDC is supported:

Upon an emergency request or an on-demand DL transmission, the BS can directly transmit a DL data overlaid on the time/frequency of the UL transmission.

At this position the FDC interference is happening.

The overlaying can include all the time slot of the UL transmission (see FIG. 7-2 (UL Slot 2) for more details) or partial short-slot (mini-slot, sTTI) as in FIG. 7-4 DL slot-n+1.

For DL UEs, the DL transmission slots and frequency are indicated either:

During the former DL control information.

By transmitting a semi-static DL-FDC pattern/map during the UL frames.

By allowing demanding UEs to perform blind decoding over the UL frames until a successful DL decoding is achieved (needs more processing power).

Notes: In case of puncturing, the spectral efficiency is degraded due to avoiding transmission in the opposite direction (UL/DL). Also, the punctured data has to consider creating a guard band to avoid inter-carrier interference; i.e., reduce the overall transmission efficiency.

Some additional characterizations on figures:

FIG. 5: Full Duplex scenario and Coexistence of on demand UL together with the TDD scheduled DL subframe; UE 1 and UE2 perform DL and UE3 perform UL.

FIG. 7-1: Flexible duplexing in TDD does not allow low latency demanding services.

FIG. 7-2: Flexible data duplexing in TDD allowing coexisting of URLLC data in the opposite direction; also as an assumption, a Dedicated URLLC band in TDD configuration. Band 1 can support FDC and legacy TDD/flexible duplexing, while band 2 supports only legacy TDD/flexible duplexing.

FIG. 7.3: Band 1 can support FDC and legacy TDD/flexible duplexing, while band 2 supports only legacy TDD/flexible duplexing. Data can be punctured or overlaid in an FDC manner. For band 2 in special/switching frames, UL and DL can be supported with frequency-division multiplexing (FDD); if not, legacy operation takes place in Band 2. For band 1 in S-frames, puncturing or overlaying in both directions are supported.

FIG. 7-4: Puncturing in time/frequency (without self-interference) for DL is possible where the BS will inform the punctured UE about the puncturing frequency and time locations.

FIG. 7-5: Puncturing (overlaying) transmission signal in time/frequency (with self-interference) for UL/DL is possible. Performance can be enhanced if the victim UE knows the puncturing (overlaying positions).

FIG. 7-6: Flexible data duplexing in TDD allowing coexisting of URLLC data in the opposite direction.

Benefits of the Techniques Here Proposed:

Dynamic and flexibility of the TDD frequency resources:

Support FD utilizing TDD bands and frame format in FDM/TDM manner

Coexistence with and without guard bands, i.e., reducing inter-user interference.

Full duplex with limited interference.

Based on the traffic requirements, FD interference can be limited (FFS optimization).

Suitable for co-existing with dynamic TDD configurations

Supports Asymmetric UL/DL traffic/service demands

Flexibility to schedule UL/DL grants in time and frequency domain as per service requirements Advantageous application fields: Latency-constrained (mission-critical) communication services, Multilevel QoS services, Narrow-band IoT devices, mMTC, ultra-reliable communication, enhanced Multiple access (MA) scheme and MAC channels.

Some assumptions that may be valid for at least one of the embodiments:
Relative locations of eNBs and all the users; and/or
SINR (or rather the INR) that may be used at each receiver; if the INR is high, then a fallback to the legacy frame formatting or SDMA can be used; and/or
Transmit power limitations; transmit power control to minimize the interference
Interference:
  Self-interference at the base-station; handled by the eNB self-interference mitigation mechanisms; and/or.
  Intra-cell UE-to-UE: which will be reduced using wider distance for FDC enabled UEs; and/or
  Self-interference at the base-station handled by the eNB self-interference mitigation mechanisms; and/or
  Intra-cell UE-to-UE: which will be reduced using wider distance for FDC enabled UEs
  The proposed idea is certainly independent of the used radio access technology (RAT) or the radio frequency band.

Multi-Connectivity Scenario

Figure 8:
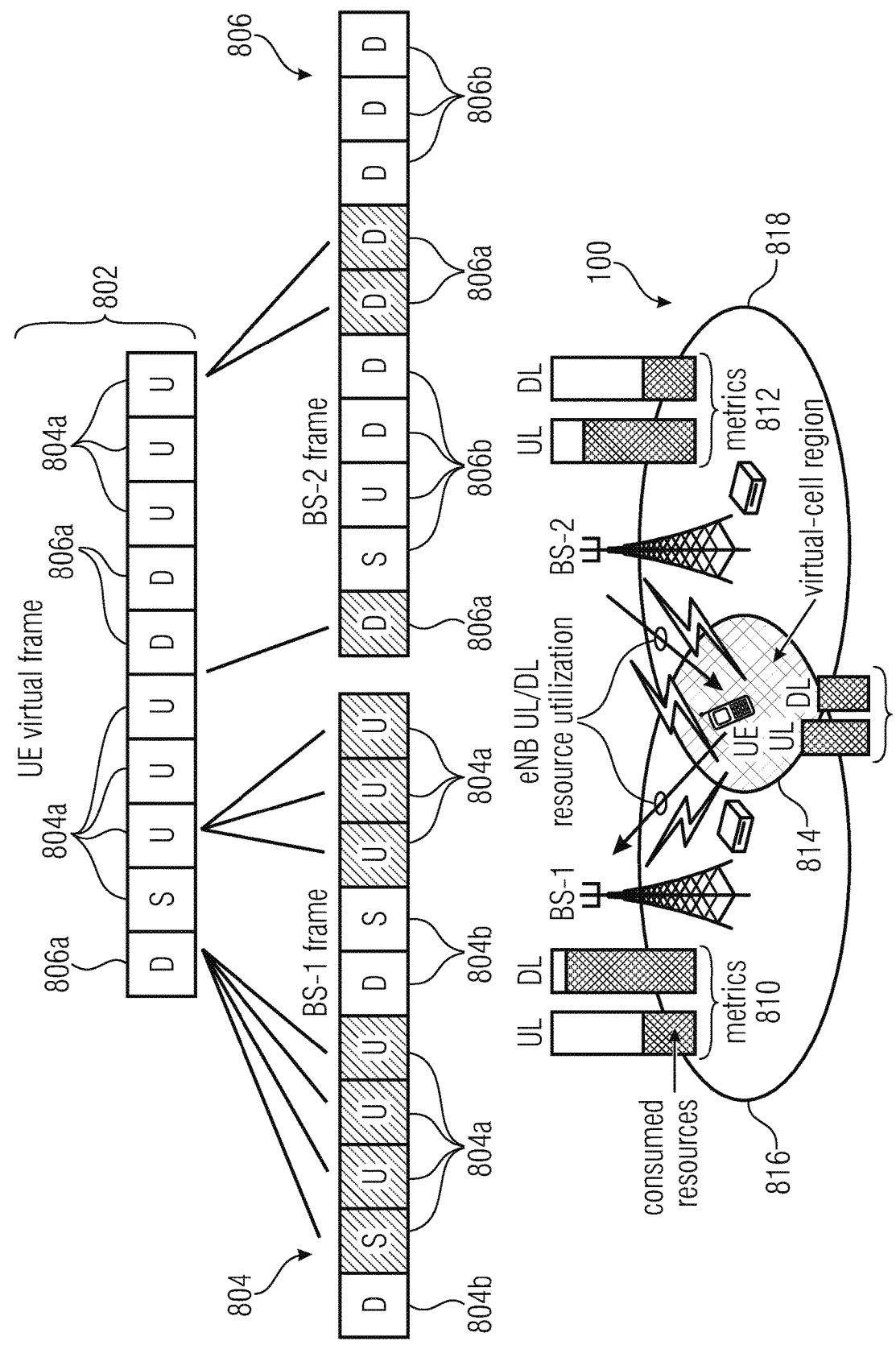
FIG. 8 shows a system according to an example.

A concept for enhancing resource management via virtual cell formation is shown in FIG. 8. It is possible to use resources from more than one BS (each BS may be, in embodiments, as the transceiver 101, and may be, for example, an eNB), here indicated as BS-1 and BS-2.

The multi-connectivity is possible in the virtual cell region 814, which is an intersection between the cell region 816 (associated to BS-1) and the cell region 818 (associated to BS-2).

Multi-connectivity may be used to resolve the pseudo congestion problem due to overloading the main cell with one direction than the other (UL or DL). Hence, a multi-connectivity (or dual connectivity) can be used to acquire resources from neighboring eNBs in opposite transmission duplexing directions. FIG. 8 regards virtual-cell/virtual-frame concept and UL/DL multi-connectivity.

With multi-connectivity, a UE (which may be one of the UEs discussed above, such as one transmitter and/or receiver 103) transmits and receives payload information to and from both the BS-1 and BS-2, e.g., in one frame. For example, a virtual frame 802 may be obtained as a virtual superposition of frames 804 (configuration 1) and 806 (configuration 5) respectively associated to BS-1 and BS-2 (notably, the obtained virtual frame 802 is not necessarily a frame according to the configurations of table 1, even if it is obtained from two frames according to configurations 1 and 5). The UE may exchange some transmissions with BS-1 in some slots, and some other transmissions with BS-2, so that a final virtual frame is composed at the end of the transmissions. As can be seen from FIG. 8, the UE virtual frame 802 is composed of both slots 804a (from the frame 804 exchanged with BS-1) and slots 806a (from the frame 806 exchanged with BS-2). In non-used slots 804b and 806b, no transmissions are performed between the UE and BS1 or BS2 (it is possible that the same band is used for different transmissions between different UEs and BS-1 and/or BS-2, in some cases). Any combination is possible after having been defined and signalled by the scheduling to the UE. The virtual frame 802 is reconstructed with communications between BS-1 and BS-2.

In general, multi-connectivity permits to reduce the payload for a particular BS. For example, metrics 810 shows that BS-1 suffers of DL overload, while metrics 812 shows that BS-2 suffers of UL overload. This may be the reason for choosing the virtual frame 802: BS-1 uses more UL slots for the communication with the UE (so as to reduce its DL overload), while BS-2 uses DL slots for the communication with the UE (so as to reduce its UL overload).

In the following, reference is made to channels which are allocated, in multi-connectivity, for UL or DL. These channels may be, for example, slots 806a and/or 804a forming one virtual frame 802 from two frames 804 and 806.

FIG. 9-1 shows a network (which may be the network 100) in which a UE1 (which may be one of the UEs 103) is connected to BS-1 and BS-2 in multi-connectivity. For example, UE1 may exchange virtual frames 802 with BS-1 and BS-2. BS-1 and BS-2 are here shown as being controlled by a control node 902, which, in some examples, may be integrated to one of BS-1 and BS-2. UE1 is in the region 814, at the border and/or intersection between regions 816 and 818, BS-1 may be configured to operate in multiconnectivity with BS-2 to perform UL and/or DL transmissions with UE1. BS-1 and BS-2 may be configured to operate in a puncturing mode by puncturing a DL transmission 905 of payload information, in a channel 921 allocated to BS-1 for the DL transmission 905 of payload information of the BS-1, to obtain, within the channel 921 allocated to BS-1, a DL free area 926 (punctured area) for a DL transmission 906 to UE1 from BS-2.

BS-1 and BS-2 may be configured to operate so that BS-2 requests BS-1 (e.g., via the control node 902) to puncture the DL transmission 905 of payload information, in the channel 921 allocated to BS-1 (for the DL transmission 905 of payload information of BS-1), to obtain, within said channel 921 allocated to BS-1, a DL free area 926 for the DL transmission 906 of BS-2 to UE1. For example, a puncturing request 904 may be transmitted by BS-1 to BS-2 (e.g., at time instant $t_p$) before the start of the transmissions of the data in the free area 926.

A puncturing notification 906 may be transmitted by BS-1 or BS-2 to UE1 (in some embodiments) after the transmission of the DL transmission 906 in the free (punctured) area 926. The UE will determine the presence of the puncturing subsequently, during a post-processing phase.

Guard times 946 (guard symbols) may be defined for taking into consideration timing tolerances.

UE1 may be configured to receive the DL transmission 905 from BS-2 in the channel 921 allocated to BS-1 for a DL transmission 905 of payload information. UE1 may be configured to receive said DL transmission 905 from BS-2 in a DL free area of the channel 946 allocated to BS-1 for the DL transmission 906 of payload information.

FIG. 9-1a shows an example of the operations 91 for the puncturing mode. At $t_1$ (step 91a) UE1 may request a puncturing mode (e.g., to BS-2). At $t_p$ (step 91b), BS2 may send the puncturing request 904 (e.g., to the control node 902 and/or to BS-1). At $t_3$ (step 91c) the puncturing request is accepted. At $t_4$ (step 91d), the puncturing notification 906 is sent (by BS-1 or BS-2) to UE1.

As can be seen from FIG. 9-1, in examples the puncturing notification 906 may arrive after the DL transmission 906 in the DL free area 926. Therefore, UE1 will determine that the DL transmission 906 in the DL free area 926 has been carried out at the puncturing notification 906. Therefore, UE1 will decode the DL transmission 906 after the puncturing notification. Should the puncturing be denied, UE1 will understand that no puncturing has been performed and only the DL transmission 905 has been performed. Therefore, UE1 will decode the DL transmission 905 (e.g., stored in a buffer) after the reception of the puncturing notification 906.

In other examples, the puncturing notification 906 (and step 91d, as well) is not necessary, as UE1 may understand the puncturing by decoding the transmission 906 (which may contain, for example, a signalling indicating the puncturing notification).

In other examples, however, the notification 906 may also arrive before the DL transmission 907.

In examples, a DL free area in the channel 921 may be determined, so as to identify the DL free area for performing a transmission 906.

In FIG. 9-2, UE1 may operate both in FDC and puncturing, as UE1 may simultaneously transmit and receive data at different frequencies to a first BS (BS-1) and a second BS (BS-2). However, a DL free area 926 may have been useful.

BS-1 and BS-2 may be configured to operate in a puncturing mode by puncturing a DL transmission 905 of payload information in a channel 921 allocated to BS-1 for the DL transmission 905 of payload information of BS-1. Within the channel 921 allocated to BS-1, a DL free area 926 may be obtained for an UL transmission 907 of UE1 to BS-2.

BS-1 and BS-2 may be configured to operate so that BS-2 sends a puncturing request 904 (e.g., at time $t_p$) to puncture the DL transmission 905 of payload information in the channel 921 allocated BS-2 for the DL transmission 905 of payload information of BS-1, to obtain, within said channel 921 allocated to BS-1, the DL free area 926 for the UL transmission 907 of UE1 to BS-1.

UE1 may be configured to receive the DL transmission 905 from BS-1 and to send an UL transmission to the second transceiver (BS-2) in the DL free (punctured) area 926, wherein the DL free area 926 is an area of the channel 921 allocated to the DL transmission 905 of payload information from BS-1. The puncturing notification 906 may be transmitted after the DL free area 926, e.g., at $t_4$.

In some examples, the same operation 91a may be performed. For example, UE1 may request puncturing at 91a and may be notified of the acceptance of the puncturing mode at 91d. However, UE1 may notwithstanding send the UL transmission before the arrival of the puncturing notification 906 at time instant $t_4$. Therefore, at instant $t_4$, the UE knows that its UL transmission 907 has been received in the free area 926 previously scheduled for the transmission 905.

In other examples, however, the notification 906 may also arrive before the UL transmission 907.

In examples, puncturing mode may also be obtained by determining a DL free area in the channel 921, so as to identify the determined DL free area as the area for performing the UL transmission 907.

FIG. 9-3 shows a case similar to FIG. 9-2. However, here the free (punctured) area 926 takes all the frequencies of the channel 921. This may be, for example, the case in which UE1 does not support FDC. Notwithstanding, puncturing may be successfully performed.

FIG. 9-4 shows a coordinated operation 950 of BS-1 and BS-2 (and in case also of the control node 902), which may, for example, integrate the method of FIG. 9-1a. At step 952 (which may embody step 91a), a BS-2 requests BS-1 or the control node 902 to puncture a DL transmission. At step 954, BS-2 or the control node 902 decides whether to perform puncturing or not. If it is decided to perform puncturing (e.g., step 91c), at step 956 an area (in the originally scheduled channel for transmitting payload information) is determined for puncturing. In any case, BS-1 (or the control node 902) signals, to BS-2 and to the UE(s) (e.g., step 91d), the choice and (in case of choosing puncturing) the determined free area for puncturing. Subsequently, the transmissions are performed (step 960), e.g., by transmitting the urgent or on demand transmission instead of the originally scheduled transmission. (As explained above, the puncturing indication notification may be sent after the transmission).

Notably, in embodiments, the operations of BS-1 and BS-2 may be exchanged with each other.

Discussion on Aspects of the Multi-Connectivity Examples

In this, as stated above, there will be a need to multiplex a DL data together with an uplink data; however, to the same you. In this case, the UE is connected/attached/synchronized to more than one Base-station, e.g., BS-1 and BS-2.

In this case, it is assumed that the two- or more-BS(s) are highly synchronized and the UE are in a dual or multi connectivity mode. The two BSs are assumed to be tied with a control node 902 or via a special Xn interface (direct connection via cable, RF or optical connection).

The scenario is split to 3 Use-cases.

Use-Case 1: DL-DL, as in FIG. 9-1

1—BS-1 is performing downlink (DL) to UE1 with the transmission in time and or frequency as in FIG. 9-1

2—Hence, after $t_p$ μsecs, BS2 sends a preparation for puncturing request to BS1 (e.g., after BS1 started and before the transmission from BS2 (at $t_p$) a request for puncturing is sent to BS1

3—Now, the DL from BS2 is scheduled to be transmitted to UE1 as indicated in the puncturing request.

4—The puncturing request (arriving at $t_p$, and early before BS2 TX) contains:
   a. The puncturing time and frequency locations
   b. The Guard periods that may be used and guard time if needed
   c. The end of BS2 transmission and the end of puncturing 5—As in the previous mechanisms, BS1 has to indicate the puncturing notification at the end (or after puncturing) of its own transmission. If the transmission was ended before puncturing, the notification is sent as early as possible in the next transmission.

Use-Case 2: DL-UL (UE with Full Duplex Enabled), as in FIG. 9-2

In this case, the UE is requested by BS2 to send an urgent UL data (The blue in FIG. x2).

BS2 does send a control information to UE1 requesting him to send UL message to it.

Thereafter, BS2 sends BS 1 at $t_p$ (as in the figure) the resources to be punctured for the UL from UE1.

When BS1 gets the request from BS2 early enough, BS1 starts to puncture its own data around the named resources.

The resources that have been punctured could have been the data sent to the UE of interest, i.e., UE1 or another UE.

If the data from BS1 is sent to UE1, and UE1 is also sending his uplink on the punctured resources for BS2, then UE1 is a full-duplex capable UE. Otherwise, UE does not need to be FDC capable.

At the end of the data transmission of BS1 (or early enough in the next frame/time-slot) a punctured indication is sent to the UE of interest (if UE1 is receiving from BS1; also UE1 might not use the puncturing data). Otherwise, the puncturing notification is sent for the intended user (any UE punctured from BS1).

Use-Case 3: DL-UL (No Full Duplex Enabled, but Flexible Duplex), as in FIG. 9-3

As use-case 1, UE1 may be receiving from BS1 and send data to BS2 fulfilling the same mechanism as in use-case 2.

However, UE1 might be not FDC capable. In this case, BS1 has to puncture all the time UE1 is going to send.

At the same time, UE1 (after being informed about the puncturing of BS1) switches his data reception (if it is receiving from BS1) and start (after gap symbols) to transmit to BS2.

After UE1 finishes transmission or BS1 puncturing time is elapsed, BS1 resumes the data transmission.

At the end of the transmitted slot (or early in the next slot), BS1 sends an indication of puncturing to UE1 (if it is the one whose data was punctured, to inform it about the successful puncturing) or to any punctured UE.

Other Examples of Puncturing/FDC

Another embodiment of puncturing is in FIG. 10-1. In this case, a BS performs a DL transmission 1005 to a first user equipment UE1. Another UE (UE2) transmits an UL transmission 1007 in a free (punctured) area 1026. The puncturing notification 1006 may be transmitted after the area 1026.

FIG. 10-2 shows an FDC overlaying. UE1 performs a transmission 1088 at the same time and simultaneously and at the same frequency of UE2. An overlaid area 1022 is obtained over a channel 1021.

Operations

FIG. 10-1 above also refers to a method for the communication between a base station, BS, a first user equipment, UE, and a second UE, comprising:
  using a scheduling, pre-allocating a communication channel (1021) for a communication (1005) in a first direction,
  wherein the system punctures the pre-allocated communication channel (1021) to obtain a free area (1026) to permit an on-demand communication (1007) between the second UE and the BS in a second direction different from the first direction.

FIG. 9-1 above also discloses a method for a communication between a first base station, BS, a second BS, and a user equipment, UE,
  using a scheduling, pre-allocating a communication channel (946) for a first downlink, DL, communication (905) from the first BS,
  wherein the system punctures the pre-allocated communication channel (946) to obtain a DL free area (926) to permit an on-demand DL communication (906) between the second BS and the UE.

FIG. 9-2 above also discloses a method for a communication between a first base station, BS, a second BS, and a user equipment, UE,
  using a scheduling, pre-allocating a communication channel (921) for a downlink, DL, communication (905) from the first BS,
  wherein the system punctures the pre-allocated communication channel (921) to obtain a DL free area (926) to permit an on-demand UL communication (907) between the UE and the second BS.

As discussed above, there may be the possibility for choosing (e.g., by the BS) between overlay and puncturing. There may be the possibly of identifying non-allocated resources for permitting the exchange of on-demand transmissions. As discussed above, in some cases there is the possibly of overlaying and/or puncturing so as one first device (UE or BS) performs a communication in one direction (DL or UL) while a second device (e.g., of the same type of the first device) performs a communication in a second direction different from the first direction.

Figure 4B:
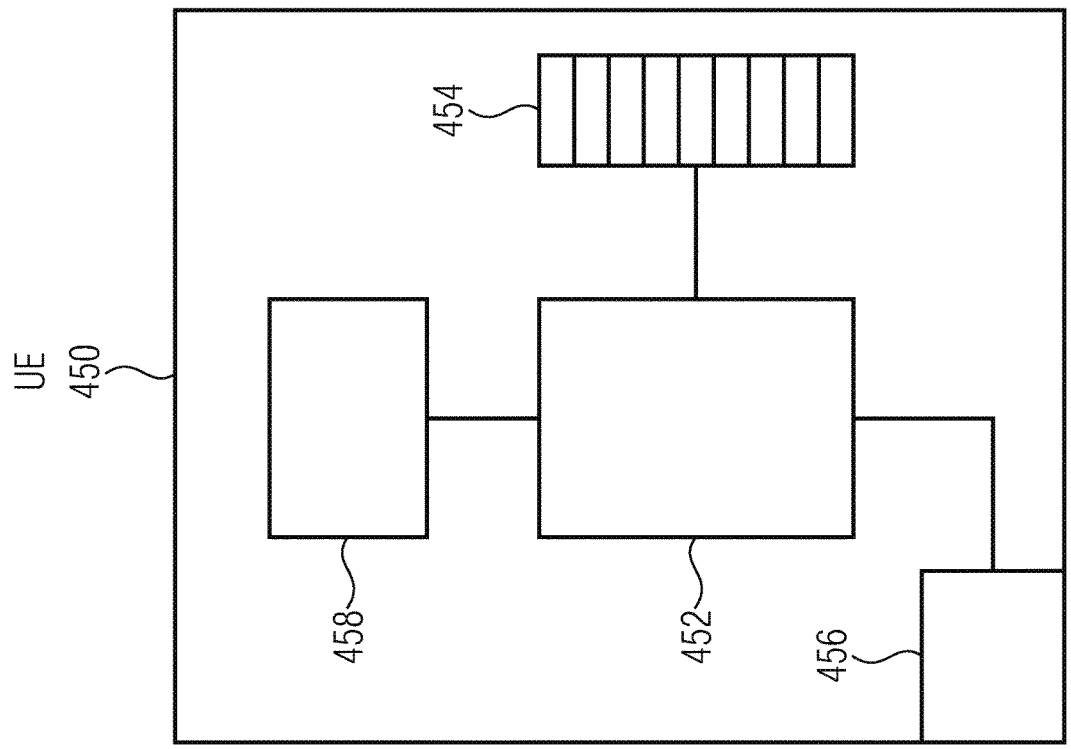
FIGS. 4a and 4b show examples of apparatus.
Figure 4A:
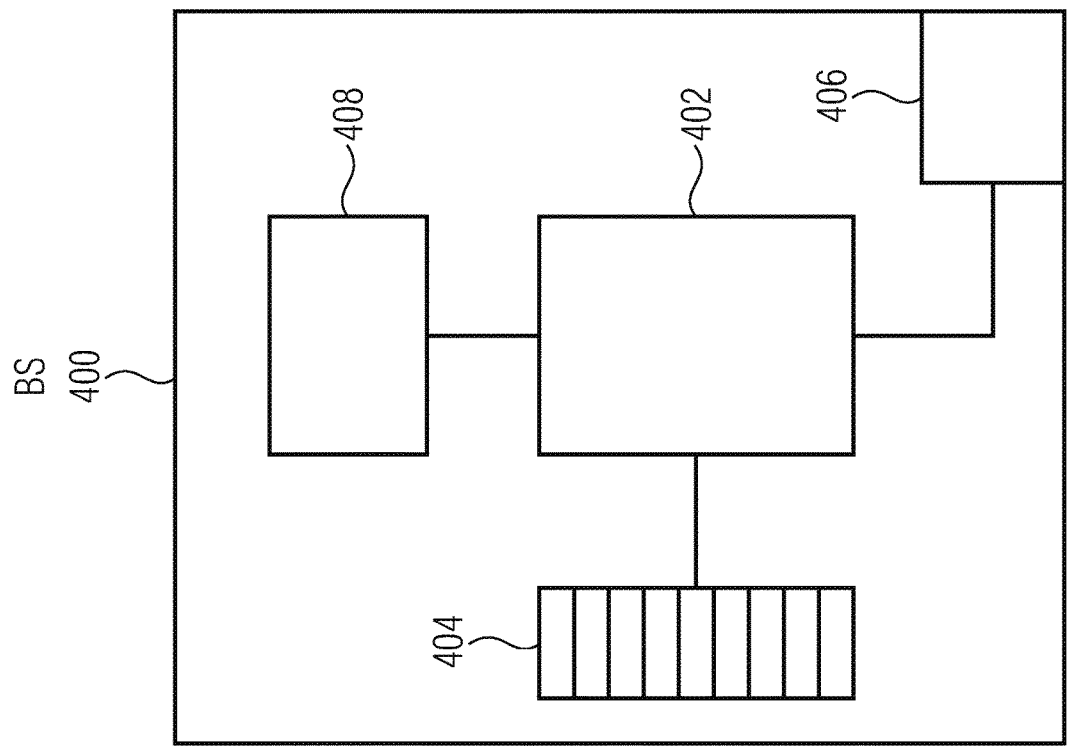

FIG. 4a shows an example of a BS 400 (e.g., one of the BSs discussed above) including a processor 402. The BS 400 may include a medium access control, MAC, procedure and scheduler 404. The BS 400 may include or be connected to an antenna 406. The BS 400 may include a non-transitory storage unit 408 storing instructions which, when running on a processor (e.g., processor 402) cause the processor to perform one of the methods above and/or to implement one of the BSs discussed above. For example, the MAC procedure and scheduler 404 may be originally defined so as to allocate different resources (time slots and/or frequency bands . . . ), in UL and/or DL, to UEs (e.g., channels 921, 1021). The MAC procedure and scheduler 404 may be updated on-line in case of necessity of performing on-demand transmissions (e.g., 906, 1007, 1088). For example, originally scheduled transmissions (e.g., 905, 1005, 1089) may be overlaid by the on-demand transmissions (e.g., in area 1022) and/or punctured so as to find a free area (e.g., 926, 1026) in the originally allocated channel for the on-demand transmission (e.g., 906, 1007, 1088).

FIG. 4b shows an example of a UE 450 (e.g., one of the UEs discussed above) including a processor 452. The UE 450 may include a MAC procedure 454. The UE 450 may include or be connected to an antenna 406. The UE 450 may include a non-transitory storage unit 458 storing instructions which, when running on a processor (e.g., processor 452) cause the processor to perform one of the methods above and/or to implement one of the BSs discussed above (e.g., in cooperation with the instructions stored in the storage unit 408 of the BS 400, for example). For example, the MAC procedure 454 may be updated, on the basis of signalling from the BS 400 so as to allocate different resources (time slots and/or frequency bands . . . ), in UL and/or DL, to transmissions of the UE 450. The MAC procedure 454 may be updated on-line (e.g., on the basis of the scheduling defined in the MAC procedure and scheduler MAC procedure and 404) in case of necessity of performing on-demand transmissions (e.g., 906, 1007, 1088). For example, originally scheduled transmissions (e.g., 905, 1005, 1089) may be overlaid by the on-demand transmissions (e.g., in area 1022) and/or punctured so as to find a free area (e.g., 926, 1026) in the originally allocated channel for the on-demand transmission (e.g., 906, 1007, 1088).

Systems

FIG. 10-1 also relates to a system (100) comprising a base station, BS, a first user equipment, UE, and a second UE,
  wherein a scheduling pre-allocates a communication channel (1021) for a downlink, DL, communication (1005),
  wherein the system is configured to puncture the pre-allocated communication channel (1021) to obtain a DL free area (1026) to permit an on-demand UL communication (1007) between the second UE and the BS.

FIG. 10-2 also relates to another example of the system (100)
  wherein a scheduling pre-allocates a communication channel (1021) for a DL communication (1005),
  wherein the system is configured to perform a choice whether to:
    puncture the pre-allocated communication channel (1021) to obtain a DL free area (1026) to permit an on-demand UL communication (1007) between the second UE and the BS; and
    operate in overlaying mode so that the second UE performs a UL communication (1088) overlaid to a DL communication (1089) to the first UE in an overlaid area (1022) of a pre-allocated communication channel (1021) pre-allocated to the DL communication (1089) to the first UE.

FIG. 9-1 also relates to a system comprising a first base station, BS, a second BS, and a user equipment, UE,
wherein a scheduling pre-allocates a communication channel (946) for a first downlink, DL, communication (905) from the first BS,
wherein the system is configured to puncture the pre-allocated communication channel (946) to obtain a DL free area (926) to permit an on-demand DL communication (906) between the second BS and the UE.

FIG. 9-2 also relates to a system comprising a first base station, BS, a second BS, and a user equipment, UE,
wherein a scheduling pre-allocates a communication channel (921) for a downlink, DL, communication (905) from the first BS,
wherein the system is configured to puncture the pre-allocated communication channel (921) to obtain a DL free area (926) to permit an on-demand UL communication (907) between the UE and the second BS.

The remaining features of the systems may be chosen by the features discussed above (also in passages which do not specifically refer to the examples of FIGS. 9-1, 9-2, 10-1, 10-2).

As was described, a UE may request for resources to be used for an UL transmission in an ongoing DL transmission and/or for resources to be used for a DL transmission in an ongoing UL transmission, in the puncturing mode as well as in the overlay mode.

According to an embodiment, a user equipment, UE, e.g., UE 103 of a wireless communication network is provided, wherein the UE is configured to perform an UL transmission 1007 to a transceiver 101 of the wireless communication network 100 in a channel 721, 1021 originally allocated to a DL transmission 105, 1005 of payload information from said transceiver 101. The UE 103 is configured to operate in puncturing mode or an overlay mode by performing said UL transmission 1007 in a DL free area 726, 1026 of said channel 721, 1021 originally allocated to the DL transmission 1005 of payload information and/or by determining a DL free area so as to perform an UL transmission. The UE is configured for requesting said transceiver for resources to be used for the UL transmission.

According to an embodiment a user equipment, UE, 103 of a wireless communication network 100 is provided, wherein the UE 103 is configured to perform an DL transmission 1007 from a transceiver 101 of the wireless communication network 100 in a channel 721, 1021 originally allocated to a UL transmission 105, 1005 of payload information to said transceiver 101. The UE 103 is configured to operate in puncturing mode or an overlay mode by performing said DL transmission 1007 in a UL free area 726, 1026 of said channel 721, 1021 originally allocated to the UL transmission 1005 of payload information and/or by determining a UL free area so as to perform an DL transmission. The UE is configured for requesting said transceiver for resources to be used for the DL transmission.

Self-Interference Mitigation Mechanisms:

Self-interference mitigation relates to cancelling self-interference at least to some extent, to remove or cancel self-interference partly or completely. For example, in the puncturing case it may be sufficient to suppress the self-interference to acceptable level where the self-interference does not saturate/prevent the local receiver from receiving its UL signals in over the punctured resources, whilst this does not preclude to reduce the self-interference as much as possible or completely.

When referring again to the self-interference mitigation explained in connection with FIGS. 7-1 to 7-6, the above-mentioned self-interference mitigation may be performed starting from different scenarios. Some embodiments described hereinafter relate to reducing or cancelling self-interference at the eNB which may also be referred to as gNB. That is, in the following, examples are provided for performing self-interference mitigation or self-interference cancellation at the eNB. Whilst the embodiments will be described in connection with an eNB for a good understanding of the implemented principles, embodiments are not limited hereto but also relate to other transceivers. For example, self-interference mitigation may be performed at a UE being in a dual-connectivity mode.

In a first scenario the eNB provides for DL communication to a UE. When being requested or indicated for a subsequent puncturing (to be implemented by the eNB) or a partial overlay, i.e., that an UL transmission is expected, the eNB may already possess information about the interference it causes by its downlink transmission in the resources that are possibly dedicated for puncturing or in which the overlay may be expected. Alternatively, the eNB may start acquiring such information after having received the indication for subsequent puncturing/overlay. That is, the eNB may already or at least start upon request a self-interference channel information acquisition. Self-interference determination may be performed by using the (ongoing) DL transmission but may alternatively or in addition be performed by a use of specially designed waveforms such as pilot symbols or probe signals. That is, the eNB may be configured to obtain the self-interference measurements by at least transmitting probe signals which are measurements signals, and by performing measurements on the probe signals.

Figure 11:
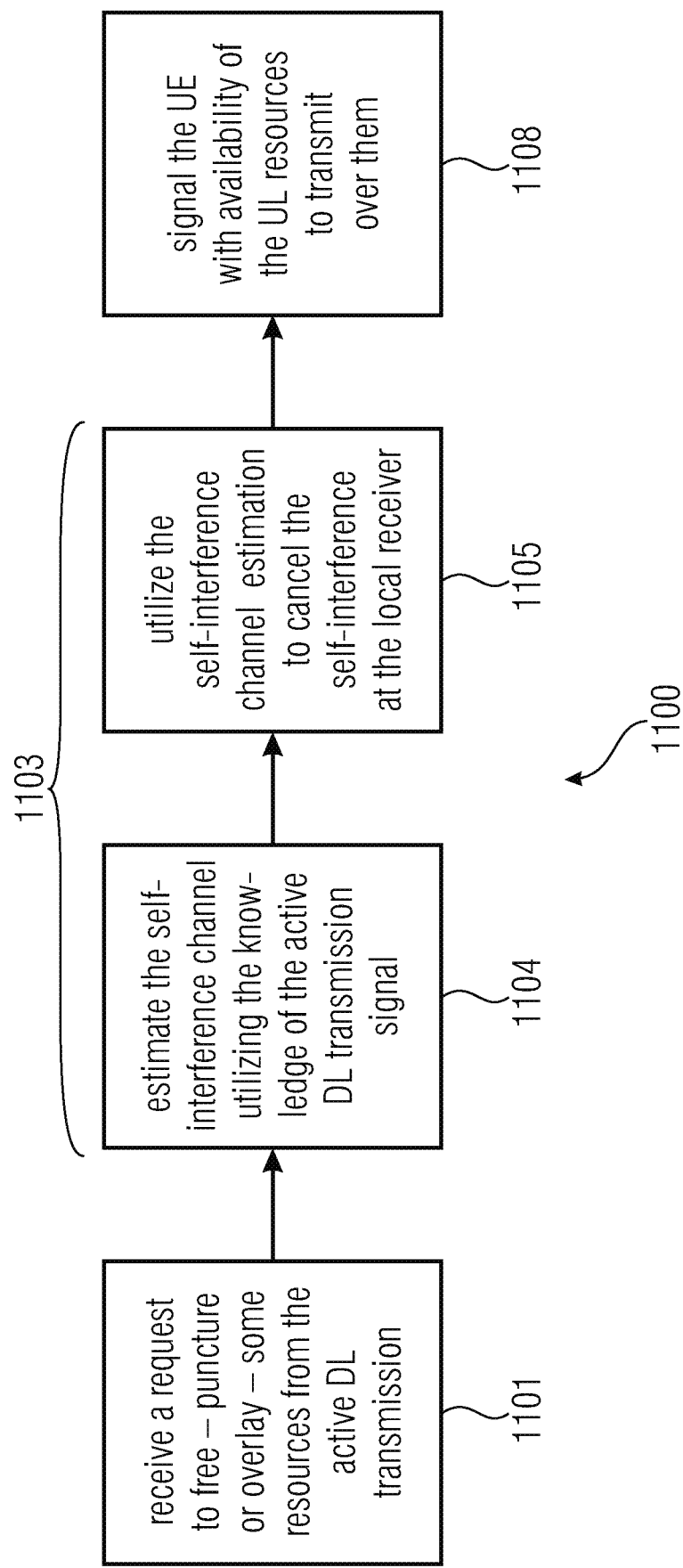
FIG. 11 shows a schematic representation of a method for performing self-interference mitigation starting from a DL scenario according to an example.

FIG. 11 shows an example flow chart of a method 1100 in accordance with the self-interference mitigation. In 1101 a request for free (puncture or overlay) some resources from active DL transmission is received, e.g., by the transmitting transceiver—the eNB. In 1103 self-interference mitigation may be performed. For doing so, in 1104 the self-interference channel may be estimated by utilizing the knowledge of the active DL transmission signal. Further, in 1105 the self-interference channel estimation may be utilized to cancel the self-interference at the local receiver. In 1108, the UE may be signaled the availability of UL resources to transmit over them. It is to be noted that 1104 may be performed anytime prior to cancel the self-interference, e.g., prior to 1101. FIG. 11 thus shows an example of an DL puncturing procedure executed at the BS based on receiving a request or the presence of demand for puncturing an active DL transmission. That is, the transceiver may be configured to obtain self-interference measurements when non-operating or not yet operating in puncturing mode, so that the transceiver, when starting to operate in the puncturing mode, performs self-interference mitigation (1103) based on at least the self-interference measurements obtained before starting the puncturing mode. Alternatively or in addition, the eNB may be configured to obtain self-interference measurements after having started to operate in puncturing mode, e.g., to update the information, so that the transceiver, when starting to operate in puncturing mode, performs self-interference mitigation (1103) based on at least the self-interference measurements obtained after having started the puncturing mode.

In other words, embodiments provide for a transceiver comprising a self-interference mitigation or self-interference cancellation (SIC) capability at the BS/eNB to enable dynamic resources allocation for the time-frequency resource grid (available resources). Self-interference cancellation may rely, at least to some extend to techniques explained in WO2017008851 (A1). Some embodiments provide a transceiver in a wireless communication system that it has the capability to at least partially cancel the self-interference signals, which are caused by the ongoing DL transmission and deteriorate the reception performance over the punctured UL resources. Furthermore, the transceiver may comprise a capability to activate this self-interference cancellation capability based on puncturing mode activation.

Embodiments relate to a self-interference channel information acquisition (update information) for SIC purpose over the punctured or overlaid (DL and UL occupied) sub-channel (resources). In order to activate the self-interference cancellation capabilities, the transceiver may possess information about what so called the self-interference channel, therefore it may initiate an estimation procedure the collect this information and utilize them for self-interference cancellation purpose. It may use the ongoing DL transmission waveforms (transmission) and/or may use specially designed waveforms for self-interference channel estimation purpose, e.g., pilot symbols or probe signals.

According to an embodiment, the eNB may evaluate for self-interference in different resources in the downlink frame and may take into consideration at which resources it is able to sufficiently perform self-interference mitigation. That is, the eNB may be configured to choose to start to operate in the puncturing mode on the basis of criteria considering the self-interference estimation. Alternatively or in addition, the eNB may configured to choose start to operate in the puncturing mode based on a self-interference suppression level, e.g., based on a level to which or an amount of self-interference that may be cancelled, avoided or that remains, such as below a threshold value.

For example, the transceiver may be configured to select the DL area to be punctured on the basis of criteria considering the self-interference estimation, so as to advantageously select a DL area to be punctured implying a comparatively reduced self-interference. For example, the eNB may select those resources (in a sufficient amount) for puncturing/overlay for which self-interference mitigation may be performed so as to reduce the self-interference below a predefined threshold. Alternatively or in addition, those resources may be selected for which the best results may be achieved with self-interference cancellation. The eNB may be configured for transmitting, to the UE at least one information (e.g., a format/configuration or the like) associated to the selected DL area to be punctured of the determined DL free area.

According to an embodiment, the UE may request for specific resources to be allocated for puncturing/overlaying. The UE may provide the eNB with information e.g., about a number or amount of resources it may use and/or with a set resources it is able to use. For example, this may provide the eNB with a basis for a selection to select the requested amount from the indicated set, e.g., based on priority/quality requirements of the DL transmission and/or based on self-interference mitigation capabilities of the eNB.

According to an embodiment, the eNB may transmit, to the UE that has requested the UL transmission causing the puncturing/overlay, an availability of the mode itself and/or of resources to be used for puncturing/overlay. Those available resources may form a basis for a selection at the UE side, i.e., which resources to use for the UL. The available resources may be determined, for example, based on the availability of self-interference mitigation and/or based on other parameters such as a priority or quality class of the payload data transmitted in the punctured or overlaid resources. That is, the UE may select from a set being offered by the eNB and/or the eNB may select from a set the UE requests.

In other words, a BS/eNB may signal to the UE at least one information indicating that the transceiver is ready to operate in puncturing mode signal. It may alternatively or in addition signal to the UE its puncturing format/configuration/subframe structure (capabilities) or/and readiness and indicating which resources are available (for grant free mode e.g. grant free UL in DL resources or control information like e.g. random access). The puncturing of the BS DL resources may be triggered based on UE UL demands. In other words, a UE signals to the BS over a control channel its needs to have a UL resource where the BS respond to a UE request by puncturing its DL resources to allocate UL resources in the punctured area. Therefore, the UE can possess the capability to signal its need for punctured resources, while the BS may possess the capabilities to process the UE request.

A UE may signal a BS to request puncturing (punctured resources), and based on this signaling the BS may execute a self-interference estimation procedure to enable the reception of the allocated punctured resources while the DL transmission is not interrupted. The BS may respond to a UE DL puncturing request, or in other words: once a BS receives a UL resource allocation (puncturing) request from the UE and then identifies the possibility/necessity to puncture its DL ongoing transmission, it can start immediately to acquire the useful knowledge about the self-interference channel.

Whilst during an ongoing DL transmission the eNB may have a basis for determining self-interference it is causing, this is not necessarily the case during an UL transmission from a UE to the BS. Simply starting to transmit symbols or predetermined specially designed waveforms might lead to disturbing or communication interrupting effects at the receiver side, e.g., a saturation of the eNB receiver which would cause ongoing communication to interrupt. Nevertheless, embodiments provide for a transceiver configured to implement a self-interference mitigation mechanism to perform self-interference mitigation. For example, the transceiver may be configured for performing a self-interference estimation based on self-interference measurements, to estimate the self-interference affecting the transceiver, so as to perform the self-interference mitigation based on the self-interference measurements.

Embodiments provide for a solution for the above identified issue by starting with a low amount of power to be used for transmitting signals/symbols/waveforms to determine self-interference to allow filters at the receiver to adapt without saturation. Embodiments provide for a transceiver that is configured for performing a self-interference estimation based on self-interference measurements, to estimate the self-interference affecting the transceiver, so as to perform the self-interference mitigation based on the self-interference measurements. The transceiver may be configured for gradually incrementing the power level of subsequent self-interference measurement signals and to gradually obtain the self-interference measurements on the measurement signals, so as to obtain self-interference estimations associated to different power levels. This may be understood as providing for a power ramp to gradually, i.e., stepwise, increase the power, e.g., starting from a preselected minimum value. That is, whilst ensuring that the ongoing transmission may be continued, simultaneously, information providing for a basis for the self-interference mitigation may be acquired.

Figure 12:
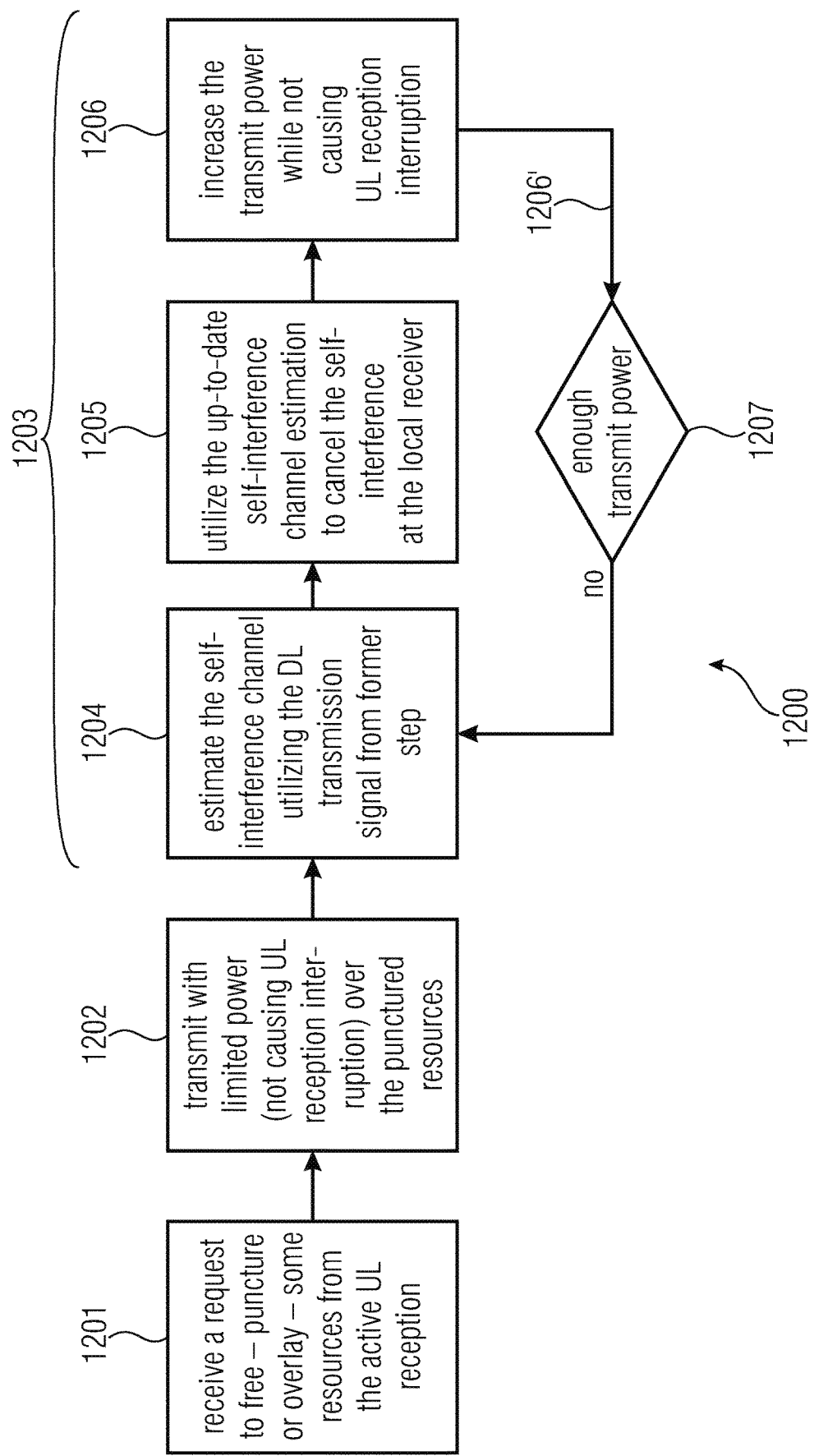
FIG. 12 shows a schematic representation of a method for performing gradual UL power ramp up and self-interference mitigation starting from an UL scenario according to an example.

FIG. 12 shows a schematic flow chart of a method implementing this embodiment. In 1201 a request is received, e.g., be the eNB, to free (puncture or overlay) some resources from the active UL transmission. In 1202 a transmission is started, e.g., with limited power which is selected so as to not cause UL reception to interrupt and by use of the punctured or overlaid resources. In 1204, the self-interference channel is estimated utilizing the DL transmission signal used a former step, i.e., 1202. That is, when compared to method 1100, the basis for estimating the self-interference channel is artificially generated in a specific way. In 1205 the up-to-date self-interference channel estimation is utilized to cancel (at least in parts) the self-interference at the local receiver (e.g., the receiver of the eNB). In 1206 the transmit power may be increased when compared to 1202 and a further transmission may be performed, i.e., the transmit power may be increased while still not causing an UL reception interruption. The transceiver may thus be configured to obtain self-interference measurements after having started to operate in the puncturing mode, so that the transceiver, when starting to operate in puncturing mode, performs self-interference mitigation based on at least the self-interference measurements obtained after having started the puncturing mode. The transceiver may be configured to obtain the self-interference measurements on measurement transmissions, wherein the transmissions include at least DL transmissions of payload data. Alternatively or in addition probe signals may be transmitted for the measurements.

This may be followed by an estimation if the transmit power is high enough, 1206' and 1207, whilst in a negative case, 1204, 1205 and 1206 (and possibly 1206' and 1207) may again be repeated until either enough transmit power is used or if instead the UL reception would interrupt. FIG. 12 thus shows an example of an UL puncturing procedure executed at the BS based on receiving a request or the presence of demand for puncturing an active UL reception In other words, a UE may signaling a BS/eNB to request puncturing (punctured resources), and based on this signaling the BS may execute a DL power ramp up procedure to enable the transmission of the allocated punctured resources while the UL reception is not interrupted. Further, the ramp up procedure over the allocated punctured DL transmission power may be used to acquire a gradually updated self-interference channel estimation that be use for self-interference cancellation purpose. Although the punctured DL resources do not overlap with the ongoing UL reception, starting immediate transmission with high power might result in saturating the local receiver. The saturation may lead to terminate the BS ongoing UL reception and corrupt the UL reception data. Therefore, to avoid this situation, a power ramp-up procedure can be executed to prevent such saturation. Once the DL resources being punctured, the BS will transmit with lower power which does not saturate the local receiver, while it acquires its first knowledge about the self-interference channel. Then this knowledge will be leveraged to cancel the UL transmission (self-interference) at the local receiver input. Then the power will be gradually increased while updating the self-interference channel knowledge. The BS will use the most up-to-date self-interference channel knowledge to cancel the self-interference at the local receiver input.

When referring again to FIG. 5, in general terms before any resource puncturing is executed, the puncturing-empowered device may be used to take care (suppress) of the self-interference signals, which would obstruct any concurrent transmission and reception. Therefore, once it is planned to take place, the puncturing-empowered device has to take action in preparation for puncturing mode operation. This preparation may include obtaining an up-to-date self-interference channel estimation for self-interference cancellation purpose. Once this is obtained, the BS can use this self-interference channel information to suppress the self-interference and enable concurrent transmission and reception. Of course, the amount of self-interference cancellation is subject to the operation mode. In a case of puncturing mode (without overlaying), it may be sufficient to partially suppress-power level wise—to prevent any receiver saturation. However, in the overlaid mode further suppression may be used to allow reception over the same overlapped resources.

There may be identified two cases:
1. The first case is where the BS is willing to puncture an ongoing DL transmission to allocate (receive) UL resources. In this case, the BS can use the ongoing DL transmission signals to estimate the self-interference channel and use this estimation for self-interference cancellation purpose.
2. The second case is where the BS is willing to puncture an ongoing UL reception to allocate (transmit) DL resources. In this case, the BS does not have ongoing DL transmission signals to utilize to estimate the self-interference channel. Therefore, in order to avoid interrupting the ongoing UL reception the BS can ramp up the transmit power over the DL allocated punctured resources. While during the power ramp up, the BS updates its self-interference channel knowledge gradually and use it to suppress the self-interference signal at the local receiver. This is in order to prevent any saturation at the receiver and interrupt by that the ongoing UL reception.

Variants

In examples above, reference is often made to frdee DL/UL areas or overlaid areas in terms of rectangles of time slots and frequency bands (as shown in FIGS. 7, 9-1, 9-2, 9-3, 10-1, 10-2). However, in examples, free areas may have different shapes. In examples, the time slot may be a flexible time slot (see FIGS. 7-2 and 7-3, "Flexible slot-1"), which is subdivided into symbols (e.g., according to configurations of Table 1, FIGS. 3b-1 and 3b-2). For example, a free area or an overlaid area may be least one symbol wide.

In examples, the BS and/or the UE may select the frequency bands and the time slots/symbols for the area for puncturing/overlaying. For example, while some frequencies may be in one direction, other frequencies at the same time may be in the different direction (as shown in FIGS. 7, 9-1, 9-2, 10-1, 10-2).

In examples, the overlaying/puncturing transmissions may be rescheduled on-the-fly (e.g., the BS may reschedule the transmissions and inform the UE(s) accordingly). In examples, the puncturing or overlaying indication information 610 may be one of the means for performing the rescheduling.

In examples, UE may autonomously determine free areas (e.g., DL free areas) in the original scheduling, so as to identify them as free areas for autonomously performing UL transmissions in the identified free areas (e.g., at increased power). In this case, a rescheduling from the BS is not necessary.

In the following, additional embodiments and aspects of the invention will be described which can be used individually or in combination with any of the features and functionalities and details described herein.

1. Transceiver (101, BS) of a wireless communication network (100), wherein the transceiver (101, BS) is configured to operate in a puncturing mode by puncturing a downlink, DL, transmission (1005) of payload information in a channel (721, 1021) originally allocated to the DL transmission (1005) of payload information or determining a DL free area, to obtain or identify, within said originally allocated channel (721, 1021) for the DL transmission (1005) of payload information, a DL free area (726, 1026) for an uplink, UL, transmission (1007) of a user equipment, UE (103), of the wireless communication network (100).

2. Transceiver (BS) of a wireless communication network (100), configured to operate, on demand, in a overlaying mode so as to define, in a channel (721, 1021) originally allocated to the DL transmission (1089) of payload information to a first user equipment, UE (UE1), an overlaid transmission with the first UE and a second UE (UE2), to obtain, within said channel (721, 1021) originally allocated to the DL transmission (1089) of payload information to the first UE, an overlaid area (722, 1022) for an UL transmission (1088) from said second UE overlaid to the DL transmission (1089) to the first UE.

3. The transceiver of aspect 1 or 2, configured to implement a self-interference mitigation mechanism (1103) to perform self-interference mitigation.

4. The transceiver of any of aspects 1 to 3, configured to perform a self-interference estimation (1104) based on self-interference measurements, to estimate the self-interference affecting the transceiver, so as to perform the self-interference mitigation (1103) based on the self-interference measurements.

5. The transceiver of any of the preceding aspects, configured to obtain self-interference measurements when non-operating in puncturing mode, so that the transceiver, when starting to operate in the puncturing mode, performs self-interference mitigation (1103) based on at least the self-interference measurements obtained before starting the puncturing mode.

6. The transceiver of any of the preceding aspects, configured to obtain self-interference measurements after having started to operate in puncturing mode, so that the transceiver, when starting to operate in puncturing mode, performs self-interference mitigation (1103) based on at least the self-interference measurements obtained after having started the puncturing mode.

7. The transceiver of any of the preceding aspects, configured to obtain self-interference measurements when non-operating in overlay mode, so that the transceiver, when starting to operate in the overlay mode, performs self-interference mitigation (1103) based on at least the self-interference measurements obtained before starting the overlay mode.

8. The transceiver of any of the preceding aspects, configured to obtain self-interference measurements after having started to operate in overlay mode, so that the transceiver, when starting to operate in overlay mode, performs self-interference mitigation (1103) based on at least the self-interference measurements obtained after having started the overlay mode.

9. The transceiver of any of aspects 4-8, configured to obtain the self-interference measurements by at least measuring a measurement signal, the measurement signal including at least a DL transmission of payload data.

10. The transceiver of aspects 4-9, configured to obtain the self-interference measurements by at least transmitting probe signals which are measurements signals, and by performing measurements on the probe signals.

11. The transceiver of any of aspects 4-10, configured to select the DL area to be punctured or overlaid on the basis of criteria considering the self-interference estimation, so as to advantageously select a DL area to be punctured or overlaid implying a comparatively reduced self-interference.

12. The transceiver of any of aspects 4-11, configured to signal (602, 624, 1114) to the UE at least one information associated to the selected DL area to be punctured or overlaid of the determined DL free area.

13. The transceiver of any of aspects 4-12, configured to choose to start to operate in the puncturing mode on the basis of criteria considering the self-interference estimation or a self-interference suppression level.

14. The transceiver of any of aspects 3-12, configured to signal (602, 624, 1114) to the UE at least one information indicating that the transceiver is ready to operate in puncturing mode.

15. The transceiver of any of aspects 4-14, configured to choose to start to operate in the overlay mode on the basis of criteria considering the self-interference estimation or a self-interference suppression level.

16. The transceiver of any of aspects 3-14, configured to signal (602, 624, 1114) to the UE at least one information indicating that the transceiver is ready to operate in overlay mode.

17. A transceiver according to one of previous aspects, configured to choose (604, 622) between operating in overlaying mode and in puncturing mode.

18. Transceiver (101) of a wireless communication network (100), wherein the transceiver (101) is configured to operate in a puncturing mode in which an UL transmission of payload information is punctured in a channel (724) originally allocated to the UL transmission of payload information from a UE (103) or in which a UL free area is determined in the channel (724) originally allocated to the UL transmission of payload information from a UE (103), to obtain or identify, within said originally allocated channel (724) for the UL transmission of payload information from the UE (103), an UL free area (727) for a DL transmission of payload information.

19. Transceiver (101) of a wireless communication network (100), configured to operate, on demand, in an overlaying mode so as to define, in a channel (724) originally allocated to the UL transmission of payload information from a first UE, an overlaid transmission with the first UE and a second UE, to obtain, within said channel (724) originally allocated to the UL transmission of payload information from the first UE, an overlaid area (752) for a DL transmission to said second UE overlaid to the UL transmission from the first UE.

20. The transceiver of aspect 18 or 19 configured to implement a self-interference mitigation mechanism (1200) to perform self-interference mitigation.

21 The transceiver of any of aspects 18 to 20, configured to perform a self-interference estimation (1204) based on self-interference measurements, to estimate the self-interference affecting the transceiver, so as to perform the self-interference mitigation (1203, 1205) based on the self-interference measurements.

22. The transceiver of aspect 21, configured to obtain self-interference measurements after having started to operate in the puncturing mode, so that the transceiver, when starting to operate in puncturing mode, performs self-interference mitigation (1203, 1205) based on at least the self-interference measurements obtained after having started the puncturing mode.

23. The transceiver of aspect 21 or 22, configured to transmit special probe signals which are measurement signals, and further configured to obtain self-interference measurements on the probe signals.

24. The transceiver of any of aspects 21 to 23, configured to gradually increment (1206) the power level of subsequent self-interference measurement signals and to gradually obtain the self-interference measurements on the measurement signals, so as to obtain self-interference estimations associated to different power levels.

25. The transceiver of aspect 24, configured decide (1207) among incrementing, reducing or maintaining the power level for subsequent DL transmissions on the basis of feedback (1206') associated to further measurement signals.

26. The transceiver of any of aspects 18 to 25, configured to choose (604, 622) between operating in overlaying mode and in puncturing mode.

27. The transceiver of aspect 17 or 26, configured to perform the choice (604, 622) on the basis of a selection and/or data associated to the first and/or second UEs.

28. The transceiver of any of the preceding aspects, configured to receive (602) a request for urgent transmission and/or an on-demand transmission from a UE, so as to choose (604) whether to allow or deny the urgent transmission and/or an on-demand transmission and/or to operate in puncturing mode and/or overlaying mode.

29. The transceiver of any of aspects 26 to 28, configured to signal (610, 624) the result of the choice (604) to the UE(s).

30. Transceiver (101, BS-1) of a wireless communication network (100), wherein the transceiver (101, BS-1) is configured to operate in multiconnectivity with an external transceiver (101, BS-2) to perform uplink, UL, and/or downlink, DL, transmissions with a UE,
wherein the transceiver (101, BS-1) is configured to operate in a puncturing mode by:
puncturing a DL transmission (905) of payload information in a channel (921) originally allocated to the transceiver (101, BS-1) for the DL transmission (905) of payload information of the transceiver (101, BS-1) or determining a DL free area in the channel (921) originally allocated to the transceiver (101, BS-1) for the DL transmission (905) of payload information of the transceiver (101, BS-1), to obtain or identify, within said channel (921) originally allocated to the transceiver (101, BS-1), a DL free area (926) for an uplink, UL, transmission (907) of the UE to the external transceiver (101, BS-2); and/or
requesting to puncture a DL transmission of payload information in a channel originally allocated to the external transceiver for the DL transmission of payload information of the external transceiver or determine a DL free area in the channel originally allocated to the external transceiver for the DL transmission of payload information of the external transceiver, to obtain or identify, within said channel originally allocated to the external transceiver, a DL free area for an UL transmission of the UE to the transceiver.

31 The transceiver of the aspect 30, configured to implement a self-interference mitigation mechanism (1103) to perform self-interference mitigation.

32. The transceiver of any of aspect 30 or 31, configured to perform a self-interference estimation (1104) based on self-interference measurements, to estimate the self-interference affecting the transceiver, so as to perform the self-interference mitigation (1103) based on the self-interference measurements.

33. The transceiver of any of aspects 30 to 32, configured to obtain self-interference measurements when non-operating in puncturing mode, so that the transceiver, when starting to operate in the puncturing mode, performs self-interference mitigation (1103) based on at least the self-interference measurements obtained before starting the puncturing mode.

34. The transceiver of any of aspects 30 to 33, configured to obtain self-interference measurements after having started to operate in puncturing mode, so that the transceiver, when starting to operate in puncturing mode, performs self-interference mitigation (1103) based on at least the self-interference measurements obtained after having started the puncturing mode.

35. The transceiver of any of aspects 32 to 34, configured to obtain the self-interference measurements by at least measuring a measurement signal, the measurement signal including at least a DL transmission of payload data.

36. The transceiver of aspects 32 to 35, configured to obtain the self-interference measurements by at least transmitting probe signals which are measurements signals, and by performing measurements on the probe signals.

37. The transceiver of any of aspects 32 to 36, configured to select the DL area to be punctured on the basis of criteria considering the self-interference estimation, so as to advantageously select a DL area to be punctured implying a comparatively reduced self-interference.

38. The transceiver of any of aspects 32 to 37, configured to signal (602, 624, 1114) to the UE at least one information associated to the selected DL area to be punctured of the determined DL free area.

39. The transceiver of any of aspects 32 to 38, configured to choose to start to operate in the puncturing mode on the basis of criteria considering the self-interference estimation.

40. The transceiver of any of aspects 31 to 38, configured to signal (602, 624, 1114) to the UE at least one information indicating that the transceiver is ready to operate in puncturing mode.

41. The transceiver of aspect 32 configured to implement a self-interference mitigation mechanism (1200) to perform self-interference mitigation.

42. The transceiver of aspect 32 or 41, configured to perform a self-interference estimation (1204) based on self-interference measurements, to estimate the self-interference affecting the transceiver, so as to perform the self-interference mitigation (1203, 1205) based on the self-interference measurements.

43. The transceiver of aspect 42, configured to obtain self-interference measurements after having started to operate in the puncturing mode, so that the transceiver, when starting to operate in puncturing mode, performs self-interference mitigation (1203, 1205) based on at least the self-interference measurements obtained after having started the puncturing mode.

44. The transceiver of aspect 42 or 43, configured to obtain self-interference measurements on measurement transmissions, wherein the transmissions include at least DL transmissions of payload data.

45. The transceiver of any of aspects 42 to 44, configured to transmit special probe signals which are measurement signals, and further configured to obtain self-interference measurements on the probe signals.

46. The transceiver of any of aspects 42 to 45, configured to gradually increment (1206) the power level of subsequent self-interference measurement signals and to gradually obtain the self-interference measurements on the measurement signals, so as to obtain self-interference estimations associated to different power levels.

47. The transceiver of aspect 46, configured decide (1207) among incrementing, reducing or maintaining the power level for subsequent DL transmissions on the basis of feedback (1206') associated to further measurement signals.

48. Transceiver (101, BS-1) of a wireless communication network (100), wherein the transceiver is configured to operate in multiconnectivity with an external transceiver (101, BS-2) to perform UL and/or DL transmissions with a UE,
wherein the transceiver (101, BS-1) is configured to operate in a puncturing mode by:
puncturing a DL transmission of payload information, in a channel (921) originally allocated to the transceiver (101, BS-1) for the DL transmission of payload information of the transceiver (101, BS-1) or determining a DL free area in the channel (921) originally allocated to the transceiver (101, BS-1) for the DL transmission of payload information of the transceiver (101, BS-1), to obtain or identify, within said channel (921) originally allocated to the transceiver (101, BS-1), a DL free area (926) for a DL transmission (906) from the external transceiver (101, BS-2) to the UE; and/or
requesting (952) to puncture a DL transmission of payload information, in a channel originally allocated to the external transceiver for the DL transmission of payload information of the external transceiver, to obtain, within said channel originally allocated to the external transceiver, a DL free area for a DL transmission of the transceiver to the UE.

49. The transceiver of any of aspects 30 to 49, wherein the transceiver is non-FDC-capable, wherein the transceiver is configured to puncture a complete slot at different frequencies, wherein the UE can be FDC-capable.

50. The transceiver of any of the preceding aspects, configured to determine the DL or UL free area (726) and/or the overlaid area (722, 724) according to a different and/or variable pattern, so as to reduce the probability of puncturing an area associated to a high signal quality.

51. A transceiver of any of the preceding aspect, wherein the DL or UL free area includes a time slot and/or one or more symbols in a flexible time slot and at least one frequency.

52. A transceiver of any of the preceding aspect, configured to select at least one frequency of the DL or UL free area.

53. A transceiver of any of the preceding aspect, configured to select at least one time slot of the DL or UL free area.

54. The transceiver of any of the preceding aspects, configured to signal (604, 622) to the UE(s):
information whether FDC or puncturing has been chosen (604); and/or
information on the UE(s) for which data are punctured and/or the UE(s) that obtain the punctured and/or a overlaid area; and/or
information on the channel (721, 724, 921, 1021) on which the puncturing or FDC is performed; and/or
information on a particular time position in which the punctured or overlaid areas (722, 726, 727, 751, 752) are to be positioned; and/or
information on frequencies of the punctured or overlaid area;
information on timing tolerances or guard times or guard symbols (741, 941, 1041) and/or guard subcarriers (742, 942, 1042).

55. A user equipment, UE, (103) of a wireless communication network (100), wherein the UE (103) is configured to perform an UL transmission (1007) to a transceiver (101) of the wireless communication network (100) in a channel (721, 1021) originally allocated to a DL transmission (105, 1005) of payload information from said transceiver (101),
wherein the UE (103) is configured to operate in puncturing mode by performing said UL transmission (1007) in a DL free area (726, 1026) of said channel (721, 1021) originally allocated to the DL transmission (1005) of payload information and/or by determining a DL free area so as to perform an UL transmission.

56. The UE of aspect 55, wherein the UE is configured, after having identified the DL free area, to autonomously perform the UL transmission in the original DL free area.

57. The UE of aspect 56, wherein the UE is configured to autonomously perform the UL transmission in the original DL occupied or free area with increased power.

58. The UE of any of aspects 55 to 57, wherein the UE is configured for requesting the transceiver for resources to be used for the UL transmission.

59. A user equipment, UE, (103) of a wireless communication network (100), wherein the UE (103) is configured to perform an UL transmission (1007) to a transceiver (101) of the wireless communication network (100) in a channel (721, 1021) originally allocated to a DL transmission (105, 1005) of payload information from said transceiver (101),
wherein the UE (103) is configured to operate in puncturing mode or an overlay mode by performing said UL transmission (1007) in a DL free area (726, 1026) of said channel (721, 1021) originally allocated to the DL transmission (1005) of payload information and/or by determining a DL free area so as to perform an UL transmission;
wherein the UE is configured for requesting said transceiver for resources to be used for the UL transmission.

60. A user equipment, UE, (103) of a wireless communication network (100), wherein the UE (103) is configured to perform an DL transmission (1007) from a transceiver (101) of the wireless communication network (100) in a channel (721, 1021) originally allocated to a UL transmission (105, 1005) of payload information to said transceiver (101),
wherein the UE (103) is configured to operate in puncturing mode or an overlay mode by performing said DL transmission (1007) in a UL free area (726, 1026) of said channel (721, 1021) originally allocated to the UL transmission (1005) of payload information and/or by determining a UL free area so as to perform an DL transmission;
wherein the UE is configured for requesting said transceiver for resources to be used for the DL transmission.

61. A user equipment, UE, of a wireless communication network (100), wherein the UE is configured to receive a DL transmission from a transceiver (101) of the wireless communication network (100) in a channel (724) originally allocated to an UL transmission (107') of payload information,
wherein the UE is configured to operate in puncturing mode by receiving said DL transmission in an UL free area (727) of said channel (724) originally allocated to the UL transmission (107') of payload information.

62. The UE of any of any of aspects 55 to 61, configured to receive (610, 624), from the transceiver (101), an indication information indicating whether the transceiver (101) operates in puncturing mode or in overlaying mode in which the UE is in DL while an external UE is in UL or vice versa.

63. The UE of aspect 62, further configured to reduce the power of the transmission in case of information indicating that the transceiver operates in FDC mode.

64. The UE of aspect 62 or 63, further configured to increase the power of the in case of information indicating that the transceiver operates in puncturing mode.

65. The UE of any of aspects 62 to 64, further configured to skip decoding data transmitted by puncturing from different UEs and/or directed to different UEs.

66. The UE of any of aspects 62 to 65, further configured to maintain, in a buffer, data received from the transceiver and to wait for supplementary data in subsequent DL transmissions.

67. A user equipment, UE, of a wireless communication network (100) for communicating with a first transceiver (BS-1) and a second transceiver (BS-2),
wherein the UE is configured to operate in puncturing mode by receiving a DL transmission from the first transceiver (BS-1) and to send an UL transmission (907) to the second transceiver (BS-2) in the DL area (926), wherein the DL free area (926) is an area of a channel (921) originally allocated to the DL transmission (905) of payload information from the first transceiver (BS-1).

68. The UE of aspect 67 configured to implement a self-interference mitigation mechanism (1200) to perform self-interference mitigation.

69. The UE of aspect 67 or 68, configured to perform a self-interference estimation (1204) based on self-interference measurements, to estimate the self-interference affecting the transceiver, so as to perform the self-interference mitigation (1203, 1205) based on the self-interference measurements.

70. The UE of aspect 69, configured to obtain self-interference measurements after having started to operate in the puncturing mode, so that the transceiver, when starting to operate in puncturing mode, performs self-interference mitigation (1203, 1205) based on at least the self-interference measurements obtained after having started the puncturing mode.

71. The UE of aspect 69 or 70, configured to transmit special probe signals which are measurement signals, and further configured to obtain self-interference measurements on the probe signals.

72. The UE of any of aspects 69 to 71, configured to gradually increment (1206) the power level of subsequent self-interference measurement signals and to gradually obtain the self-interference measurements on the measurement signals, so as to obtain self-interference estimations associated to different power levels.

73. The UE of aspect 72, configured decide (1207) among incrementing, reducing or maintaining the power level for subsequent DL transmissions on the basis of feedback (1206') associated to further measurement signals.

74. A user equipment, UE, of a wireless communication network, wherein the UE is configured to receive a DL transmission (906) from a second transceiver (BS-2) of the wireless communication network in a channel (921) originally allocated to a first transceiver (BS-1) for a DL transmission (906) of payload information, wherein the UE is configured to operate in puncturing mode by receiving said DL transmission (906) from the second BS (BS-2) in a DL free area (926) of said channel (921) originally allocated to the first transceiver (BS-1) for the DL transmission (905) of payload information.

75. A system (100) comprising a base station, BS, a first user equipment, UE, and a second UE,
wherein an original scheduling pre-allocates a communication channel (1021) for a downlink, DL, communication (1005), wherein the system is configured operate in a puncturing mode so as to puncture the pre-allocated communication channel (1021) to obtain a DL free area (1026) to permit an on-demand UL communication (1007) between the second UE and the BS or to identify a DL free area in the pre-allocated DL area.

76. A system (100) comprising a base station, BS, a first user equipment, UE, and a second UE,
wherein an original scheduling pre-allocates a communication channel (1021) for a DL communication (1005),
wherein the system is configured to
operate in overlaying mode so that the second UE performs a UL communication (1088) overlaid to a DL communication (1089) to the first UE in an overlaid area (1022) of a pre-allocated communication channel (1021) pre-allocated to the DL communication (1089) to the first UE.

77. The system of aspects 75 and 76, configured to perform a choice between operating in puncturing mode and operating in overlaying mode.

78. A system comprising a first base station, BS, a second BS, and a user equipment, UE,
wherein an original scheduling pre-allocates a communication channel (946) for a first downlink, DL, communication (905) from the first BS,
wherein the system is configured to operate in puncturing mode so as to puncture the pre-allocated communication channel (946) to obtain a DL free area (926) to permit an on-demand DL communication (906) between the second BS and the UE or to identify a DL free area to permit an on-demand DL communication between the second BS and the UE.

79. A system comprising a first base station, BS, a second BS, and a user equipment, UE,
wherein an original scheduling pre-allocates a communication channel (921) for a downlink, DL, communication (905) from the first BS,
wherein the system is configured to operate in puncturing mode so as to puncture the pre-allocated communication channel (921) to obtain a DL free area (926) to permit an on-demand UL communication (907) between the UE and the second BS or to identify a DL free area in the original scheduling so as to permit an on-demand UL communication (907) between the UE and the second BS in the identified DL free area.

80. A method for the communication between a base station, BS, a first user equipment, UE, and a second UE, comprising:
using an original scheduling, pre-allocating a communication channel (1021) for a communication (1005) in a first direction,
wherein the system punctures the pre-allocated communication channel (1021) to obtain a free area (1026), or identifies a free area, to permit an on-demand communication (1007) between the second UE and the BS in a second direction different from the first direction.

81. A method for a communication between a first base station, BS, a second BS, and a user equipment, UE, using an original scheduling, pre-allocating a communication channel (946) for a first downlink, DL, communication (905) from the first BS,
wherein the system punctures the pre-allocated communication channel (946) to obtain a DL free area (926), or identifies a free area, to permit an on-demand DL communication (906) between the second BS and the UE.

82. A method for a communication between a first base station, BS, a second BS, and a user equipment, UE, using a scheduling, pre-allocating a communication channel (921) for a downlink, DL, communication (905) from the first BS, wherein the system punctures the pre-allocated communication channel (921) to obtain a DL free area (926) to permit an on-demand UL communication (907) between the UE and the second BS.

83. A method for the communication between a transceiver, a first user equipment, UE, and a second UE, comprising:
using an original scheduling, pre-allocating a communication channel (1021) for a communication (1005) in a first direction,
overlaying the pre-allocated communication channel to obtain a overlaid area to permit an on-demand communication (1088) between the second UE and the BS in a second direction different from the first direction.

84. A non-transitory storage unit storing instructions which, when running in a processor, cause the processor to perform a method according to any of aspects 80 to 83.

Further Embodiments

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

ACRONYMS eNB Evolved Node B (3G base station), transceiver
LTE Long-Term Evolution
UE User Equipment (User Terminal)
ACLR Adjacent channel leakage ratio
TDD Time Division Duplex
FDD Frequency Division Duplex
OFDMA Orthogonal Frequency-Division Multiple Access
CQI Channel Quality Information
CRC Cyclic Redundancy Check
SPS Semi-persistent Scheduling
DCI Downlink Control Information
UL Uplink
DL Downlink(s)
TTI (short) Transmission Time Interval
PUSCH Physical Uplink Shared Channel
PUCCH Physical Uplink Control Channel
PDSCH Physical Downlink Shared Channel
PDCCH Physical Downlink Control Channel
URLLC Ultra-reliable Low-latency Communications
RAT Radio Access Technology
SR scheduling request
HARQ hybrid automatic repeat request
QOS hybrid automatic repeat request
URLLC ultra-reliable and low latency communications
MCS Modulation coding scheme
MA Multiple access
SIC Self-Interference cancellation

The invention claimed is:

1. A transceiver of a wireless communication network, wherein the transceiver is configured to operate in a puncturing mode by puncturing a downlink, DL, transmission of payload information in a channel originally allocated to the DL transmission of payload information or determining a DL free area, to achieve or identify, within said originally allocated channel for the DL transmission of payload information, a DL free area for an uplink, UL, transmission of a user equipment, UE, of the wireless communication network to the transceiver.

2. A transceiver of a wireless communication network, wherein the transceiver is configured to operate in a puncturing mode in which an UL transmission of payload information is punctured in a channel originally allocated to the UL transmission of payload information from a UE or in which a UL free area is determined in the channel originally allocated to the UL transmission of payload information from a UE, to achieve or identify, within said originally allocated channel for the UL transmission of payload information from the UE, an UL free area for a DL transmission of payload information to the UE.

3. The transceiver of claim 1, configured to determine the DL or UL free area and/or the overlaid area according to a different and/or variable pattern, so as to reduce the probability of puncturing an area associated to a high signal quality.

4. The transceiver of claim 1, wherein the DL or UL free area comprises a time slot and/or one or more symbols in a flexible time slot and at least one frequency.

5. The transceiver of claim 1, configured to select at least one frequency of the DL or UL free area.

6. The transceiver of claim 1, configured to select at least one time slot of the DL or UL free area.

7. A user equipment (UE) of a wireless communication network, wherein the UE is configured to perform an UL transmission to a transceiver of the wireless communication network in a channel originally allocated to a DL transmission of payload information from said transceiver,
wherein the UE is configured to operate in puncturing mode by performing said UL transmission in a DL free area of said channel originally allocated to the DL transmission of payload information and/or by determining a DL free area so as to perform an UL transmission to the transceiver.

8. The UE of claim 7, wherein the UE is configured, after having identified the DL free area, to autonomously perform the UL transmission in the original DL free area.

9. The UE of claim 8, wherein the UE is configured to autonomously perform the UL transmission in the original DL occupied or free area with increased power.

10. A user equipment (UE) of a wireless communication network, wherein the UE is configured to receive a DL transmission from a transceiver of the wireless communication network in a channel originally allocated to an UL transmission of payload information,
wherein the UE is configured to operate in puncturing mode by receiving said DL transmission in an UL free area of said channel originally allocated to the UL transmission of payload information from the UE.

11. The UE of claim 7, configured to receive, from the transceiver, an indication information indicating whether the transceiver operates in puncturing mode or in overlaying mode in which the UE is in DL while an external UE is in UL or vice versa.

12. The UE of claim 11, further configured to increase the power of the in case of information indicating that the transceiver operates in puncturing mode.

13. A system comprising a base station, BS, a first user equipment, UE, and a second UE,
wherein an original scheduling pre-allocates a communication channel for a downlink, DL, communication,
wherein the system is configured operate in a puncturing mode so as to puncture the pre-allocated communication channel to achieve a DL free area to permit an on-demand UL communication between the second UE and the BS or to identify a DL free area in the pre-allocated DL area for an UL transmission from the UE to the base station.

14. A method for the communication between a base station, BS, a first user equipment, UE, and a second UE, comprising:
using an original scheduling, pre-allocating a communication channel for a communication in a first direction,
wherein the system punctures the pre-allocated communication channel to achieve a free area, or identifies a free area, to permit an on-demand communication between the second UE and the BS in a second direction different from the first direction.

15. A non-transitory digital storage medium having a computer program stored thereon to perform a method for the communication between a base station, BS, a first user equipment, UE, and a second UE, said method comprising:
using an original scheduling, pre-allocating a communication channel for a communication in a first direction,
wherein the system punctures the pre-allocated communication channel to achieve a free area, or identifies a free area, to permit an on-demand communication between the second UE and the BS in a second direction different from the first direction,
when said computer program is run by a computer.

* * * * *